United States Patent [19]

Koppe et al.

[11] 3,821,234
[45] June 28, 1974

[54] 1-PYRAZOLY-ALKYL-4-PHENYL-3,4-DEHYDROPIPERIDINES

[75] Inventors: Volker Koppe; Karl Schulte; Joachim Borck; Eike Poetsch; Helmut Muller-Calgan, all of Darmstadt, Germany

[73] Assignee: Merck Patent Gesellschaft mit Beschraenkter Haftung, Darmstadt, Germany

[22] Filed: Dec. 7, 1971

[21] Appl. No.: 205,707

[30] Foreign Application Priority Data

Dec. 10, 1970 Germany............................ 2060816

[52] U.S. Cl. 260/295 AM, 260/244 R, 260/256.4 R, 260/293.58, 260/293.68, 260/293.7, 260/294.8 D, 260/294.9, 260/296 R, 260/297 B, 260/999
[51] Int. Cl............................................. C07d 29/38
[58] Field of Search................ 260/295 AM, 296 R

[56] References Cited
UNITED STATES PATENTS 2,937,177  5/1960  Bach et al........................... 260/268
3,226,392  12/1965  Carabateas...................... 260/293.4
3,354,167  11/1967  Klosa................................. 260/295

Primary Examiner—Henry R. Jiles
Assistant Examiner—G. Thomas Todd
Attorney, Agent, or Firm—Millen, Raptes & White

[57] ABSTRACT

Piperidine derivatives of the formula

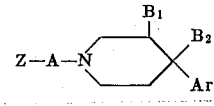

wherein Z is a 1,3-benzodioxolyl-5, a pyrazolyl-3, pyrazolyl-4, pyrazolyl-5, or thiazolyl-5 residue, or one of the latter four residues substituted by one or both of one or more alkyl groups of from one to four carbon atoms and an N-acyl group; A is linear of branched alkylene of one to six carbon atoms; $B_1$ and $B_2$ each are H or OH, or collectively a C—C bond; and Ar is phenyl or a phenyl group substituted by one or more members selected from the group consisting of halogen atoms and alkyl and alkoxy each of one to four carbon atoms, and their acid addition and quaternary ammonium salts have useful pharmacological properties, including a tranquilizing effect.

17 Claims, No Drawings

1-PYRAZOLY-ALKYL-4-PHENYL-3,4-DEHYDROPIPERIDINES

BACKGROUND OF THE INVENTION

This invention relates to novel N-heterocyclicalkyl substituted novel piperidine derivatives having useful pharmacological properties.

It is an object of this invention to provide novel piperidine derivatives and processes for their preparation.

A further object of this invention is to provide pharmacutical preparations having novel piperidine derivatives as an active ingredient.

An additional object of this invention is to provide a process for obtaining a tranquilizing effect in mammals.

SUMMARY OF THE INVENTION

The novel piperidine derivatives of this invention are piperidine derivatives of the Formula I

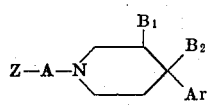

I wherein Z is a 1,3-benzodioxolyl-5, a pyrazolyl-3, pyrazolyl-4, pyrazolyl-5, or thiazolyl-5 residue, or one of the latter four residues substituted by one or both of one or more alkyl groups of from one to four carbon atoms and an N-acyl group; A is linear or branched alkylene of one to six carbon atoms; $B_1$ and $B_2$ each are H or OH, or collectively a C—C bond; and Ar is phenyl or a phenyl group substituted by one or more members selected from the group consisting of halogen atoms and alkyl and alkoxy each of one to four carbon atoms, and the physiologically acceptable acid addition salts and quaternary ammonium salts thereof. These compounds exhibit valuable pharmacological properties, in particular, with good compatibility, a tranquilizing effect. They also exhibit one or more of narcosis-potentiating, sedative, hypnotic, narcotic, adrenolytic, antihistaminic, serotoninolytic, and spasmolytic effects. Accordingly, the novel compounds can be utilized as drugs as well as intermediates for the production of further drugs.

The compounds of Formula I comprise 1,3-benzodioxolyl-5 derivatives I(a); pyrazolyl-3 derivatives I(b); pyrazolyl-4 derivatives I(c); pyrazolyl-5 derivatives I(d); and thiazolyl-5 derivatives I(e) of the following formulae, respectively:

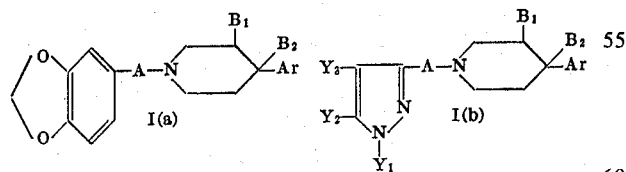

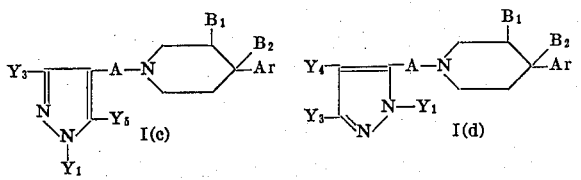

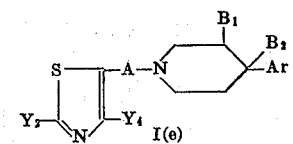

In Formulae I(a) through I(e), $Y_1$ is H, alkyl of one to four carbon atoms, or acyl, preferably carboxylic acyl of up to 10 carbon atoms; $Y_2$, $Y_3$, $Y_4$ and $Y_5$, which can be alike or different, each are H or alkyl of one to four carbon atoms, preferably H or $CH_3$; and A, Ar, $B_1$, and $B_2$ have the values given above. Compounds of Formulae I(b) and I(d) are tautomeric when $Y_1 = H$, so that $Y_2$ and $Y_3$, respectively, in Formula I(b) correspond to $Y_3$ and $Y_4$, respectively in Formula I(d).

Accordingly, this invention relates to piperidine derivatives of Formulae I and I(a)–I(e), respectively, as well as to the physiologically acceptable acid addition salts and quaternary ammonium salts thereof. Of the above five classes of compounds, those of general Formula I(b) are preferred.

Furthermore, the invention relates to the following preferred groups of compounds within the scope of Formula I (or I(a)–I(e), respectively), including the physiologically acceptable acid addition salts and quaternary ammonium salts thereof, with those groups not specifically defined having the aforementioned values:

I(f) Z is a 1,3-benzodioxylyl-5(3,4-methylenedioxyphenyl) residue, a pyrazolyl-3, pyrazolyl-4, pyrazolyl-5, or thiazolyl-5 residue, in which the latter four residues are optionally substituted by one or more methyl groups and/or an N-acyl group, preferably hydrocarbon carboxylic acid acyl, of up to 10 carbon atoms;

I(g) Z is a 1,3-benzodioxolyl-5 residue or a pyrazolyl-3, pyrazolyl-4, pyrazolyl-5, or thiazolyl-5 residue, in which the latter four residues are optionally substituted by one or more methyl groups;

I(h) A is $-CH_2CH_2-$, $-CH_2CH(CH_3)-$, $-CH_2CH_2CH_2-$, or $-CH_2CH_2CH_2CH_2-$;

I(i) $B_1$ and $B_2$ each are H or, collectively, a C—C bond;

I(j) Ar is phenyl, optionally substituted by a chlorine atom, methyl or methoxy;

I(k) Ar is phenyl;

I(l) Z is a 1,3-benzodioxolyl-5, a pyrazolyl-3, pyrazolyl-4, pyrazolyl-5, or thiazolyl-5 residue, which latter four residues are optionally substituted by one, two or more methyl groups;

A is $-CH_2CH_2-$; $-CH_2CH(CH_3)-$; $-CH_2CH_2CH_2-$; or $-CH_2CH_2CH_2CH_2-$;

$B_1$ and $B_2$ each are H, or collectively, a C—C bond; and Ar is phenyl, optionally substituted by a chlorine atom, methyl or methoxy;

I(m) Z is 1,3-benzodioxolyl-5, pyrazolyl-3, 5-methyl-pyrazolyl-3, pyrazolyl-4, 1-methyl-pyrazolyl-4, 1,3-dimethyl-pyrazolyl-5, 4-methyl-thiazolyl-5, or 2,4-dimethyl-thiazolyl-5;

A is $-CH_2CH_2-$, $-CH_2CH(CH_3)-$, $-CH_2CH_2CH_2-$ or $-CH_2CH_2CH_2CH_2-$;

$B_1$ and $B_2$ each are H or, collectively, a C—C bond; and Ar is phenyl.

This invention relates to a process for the preparation of piperidine derivatives of Formula I, including the physiologically acceptable acid addition salts and quaternary ammonium salts thereof, in which (i) a compound of Formula II

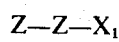

II wherein $X_1$ is X or $NH_2$, and X is Cl, Br, I or an OH or functionally modified OH-group, is reacted with a compound of Formula III

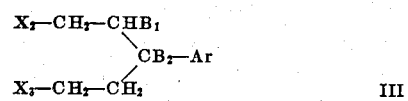

III wherein $X_2$ and $X_3$, which can be identical or different, each represent, when $X_1 = NH_2$, respectively X, and otherwise together NH; or (ii) a nitrile of Formula IV

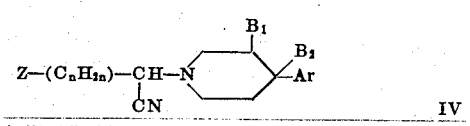

IV wherein n is an integer from 0 to 4, inclusive, is reacted with an organometallic compound of Formula V

V wherein M is MgHal, $CdR_1$, $ZnR_1$, or an alkali metal, preferably lithium, in which $R_1$ is alkyl of one to five carbon atoms; and Hal is Cl, Br, or I, provided that the sum of n and the number of carbon atoms in $R_1$ is no greater than 5; or (iii) a compound of Formula VI

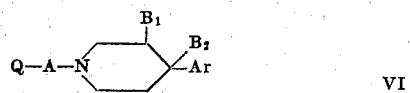

VI wherein Q is $R_2$—CO—$CHR_3$—CO—; $R_2$—CO—CH-(CO—$R_3$); $R_2$—CO—CHX—, or a pyrimidyl-4, pyrimidyl-5, or pyrimidyl-6 residue, the latter three resides being optionally substituted by one, two or more alkyl groups of from one to four carbon atoms, and $R_2$ and $R_3$, which can be identical or different, are H or alkyl of one to four carbon atoms, or a functional derivative of a compound of Formula VI, is reacted with a compound of Formula VII

VII wherein $R_4$ is H or alkyl of one to four carbon atoms and L is —NH— or —CS—, or with a functional derivative of such a compound, respectively; or (iv) a compound of Formula VIII

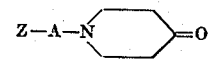

VIII is reacted with a compound of Formula IX

IX or a compound of Formula X

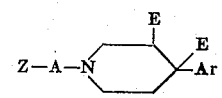

X wherein one of E is X or $NH_2$ and the other is H, is treated with an agent which splits off HE; or a compound of Formula XI

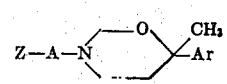

XI is treated with an acid; or (v) a compound otherwise corresponding to Formula I, but which contains, in addition to or in place of, H atoms, at least one reducible group, or a C—C or C—N multiple bond, is treated with a reducing agent; or (vi) a compound otherwise corresponding to Formula I, but which contains, in place of at least one H atom or an OH-group, a group which can be split off by solvolysis, preferably an acyl group or a halogen atom, is treated with a solvolyzing agent; or (vii) in a compound otherwise corresponding to Formula I but which contains, in place of at least one halogen atom or OH-group, an amino group which is replaced, after diazotization, by halogen or OH; and optionally, in a compound of Formula I, a molecule of water is added to a double bond present in the 3(4)-position of the piperidine ring by treatment with a hydrating agent, and/or a free NH-group is acylated by treatment with an acylating agent, and/or a compound of Formula I is converted, by treatment with an acid or a quaternizing agent, into a physiologically acceptable acid addition or quaternary ammonium salt, respectively, and/or a compound of Formula I is liberated with a base, and/or a racemate mixture of Formula I is separated into individual racemates and/or a racemate of Formula I is separated into the optical antipodes thereof.

In the formulae, Z, A, $B_1$, $B_2$, Ar, X and M have the meanings indicated in Formulae I, II and V, respectively.

DETAILED DISCUSSION

In the compounds of this invention, Z preferably has the value given in Formula I(m). Z can also be, for example, 1-methyl-pyrazolyl-3, 4-methyl-pyrazolyl-3, 1,4-dimethyl-pyrazolyl-3, 1,5-dimethyl-pyrazolyl-3, 4,5-dimethyl-pyrazolyl-3, 1,4,5-trimethyl-pyrazolyl-3, 3-methyl-pyrazolyl-4, 1,3-dimethyl-pyrazolyl-4, 1,5-dimethyl-pyrazolyl-4, 3,5-dimethyl-pyrazolyl-4, 1,3,5-trimethyl-pyrazolyl-4, 1-methyl-pyrazolyl-5, 1,4-dimethyl-pyrazolyl-5, 1,3,4-trimethyl-pyrazolyl-5, thiazolyl-5. In place of the methyl groups, in the above groups ethyl, n-propyl, isopropyl, n-butyl, isobutyl, sec.-butyl, or tert.-butyl groups can also or alternatively be present, such as, for example, 5-ethyl-pyrazolyl-3, 5-n-propyl-pyrazolyl-3, 1-isopropyl-pyrazolyl-4, 1-methyl-3-n-butyl-pyrazolyl-5 and 2,4-diethyl-thiazolyl-5.

When Z contains an N-acyl group, the latter is preferably that of an aliphatic, aromatic, araliphatic, or cycloaliphatic carboxylic acid of up to 10 carbon atoms, or from a derivative of carbonic acid or carbamic acid. For example, acyl can be, alkanoyl, e.g., formyl, acetyl, propionyl, butyryl, isobutyryl, valeryl, isovaleryl, trimethylactyl, caproyl, enanthoyl, octanoyl, nonanoyl, decanoyl, stearoyl; alkenoyl, e.g., acryloyl, crotonoyl; alkinoyl, e.g., propinoyl; aroyl, e.g., benzoyl, o-, m-, or p-toluyl, 1- or 2-napthoyl; alkoxyaroyl, e.g., o-, m-, or p-methoxybenzoyl, 3,4-dimethoxybenzoyl, 3,4,5-trimethoxybenzoyl; aminoaroyl, e.g., o-, m-, or p-aminobenzoyl, p-dimethylaminobenzoyl; arylalkanoyl, e.g., phenylacetyl, 2- or 3-phenylpropionyl, 2-, 3-, or 4-phenylbutyryl; arylalkenoyl, e.g., cinnamoyl; cycloalkyl, e.g., hexahydrobenzoyl; cycloalkylalkyl, e.g., cyclopentylacetyl, 3-cyclohexylpropionyl; alkoxycarbonyl, e.g., methoxycarbonyl, ethoxycarbonyl, n-butoxycarbonyl; carbamoyl; alkylcarbamoyl, e.g., N-methylcarbamoyl and N,N-dimethylcarbamoyl.

In the starting compounds and products of this invention, A preferably is —$CH_2$—, —$CH_2CH_2$—, —$CHCH_3$—, —$CH_2CH_2CH_2$—, —$CH(CH_3)CH_2$—, —$CH_2CH(CH_3)$—, —$CHC_2H_5$—, —$CH_2CH_2CH_2CH_2$—, —$CH(CH_3)CH_2CH_2$—, —$CH_2CH(CH_3)CH_2$—, —$CH_2CH_2CH(CH_3)$—, —$(CH_2)_5$— or —$(CH_2)_6$—. Other A groups are —$CH(CH_3)CH(CH_3)$—, —$CH(C_2H_5)CH_2$—, —$CH_2CH(C_2H_5)$—, —$CH(n-C_3H_7)$—, —$CH(iso-C_3H_7)$—, —$CH(CH_3)CH_2CH_2CH_2$—, —$CH_2CH(CH_3)CH_2CH_2$—, —$CH_2CH_2CH(CH_3)CH_2$—, —$CH_2CH_2CH_2CH(CH_3)$—, —$CH(CH_3)CH_2CH(CH_3)$—, —$CH(CH_3)CH(CH_3)CH_2$—, —$CH_2CH(CH_3)CH(CH_3)$—, —$CH(C_2H_5)CH_2CH_2$—, —$CH_2CH(C_2H_5)CH_2$—, —$CH_2CH_2CH(C_2H_5)$—, —$CH(n-C_3H_7)CH_2$—, —$CH_2CH(n-C_3H_7)$—, —$CH(iso-C_3H_7)CH_2$—, —$CH_2CH(iso-C_3H_7)$—, —$CH(n-C_4H_9)$—, —$CH(iso-C_4H_9)$—, —$CH(sec.-C_4H_9)$—, —$CH(tert.-C_4H_9)$—, —$CH(CH_3)CH_2CH_2CH_2CH_2$—, —$CH_2CH(CH_3)CH_2CH_2CH_2$—, —$CH_2CH_2CH(CH_3)CH_2CH_2$—, —$CH_2CH_2CH_2CH(CH_3)$—$CH_2$—, —$CH_2CH_2CH_2CH_2CH(CH_3)$—, —$CH_2CH_2CH(CH_3)CH(CH_3)$.

In the starting compounds and products of this invention, Ar preferably is phenyl; alkylphenyl, e.g., o-, m-, or p-tolyl, 2,4-dimethylphenyl, o-, m-, or p-ethylphenyl, p-isopropylphenyl and 2-methyl-5-isopropylphenyl; alkoxylphenyl, e.g., o-, m-, or p-methoxyphenyl, 3,4-dimethoxyphenyl, o-, m-, or p-ethoxyphenyl, o-, m-, or p-n-propoxyphenyl, o-, m-, or p-isopropoxyphenyl, o-, m-, or p-n-butoxyphenyl, o-, m-, or p-isobutoxyphenyl, o-, m-, or p-sec.-butoxyphenyl, o-, m-, or p-tert.-butoxyphenyl, 3-methoxy-4-ethoxyphenyl, 3-ethoxy-4-methoxyphenyl, 3,4-diethoxyphenyl, 3,4-di-n-propoxyphenyl, 3,4-di-n-butoxyphenyl, 3,4,5-trimethoxyphenyl and 2-methoxy-5-methylphenyl; or halophenyl, e.g., o-, m-, or p-fluorophenyl, o-, m-, or p-chlorophenyl, 2,3-, 2,4-, 2,5-, 2,6-, 3,4-, or 3,5-dichlorophenyl, 2,4,6-trichlorophenyl, o-, m-, or p-bromophenyl, 2,4-dibromophenyl, o-, m-, or p-iodophenyl.

X, in addition to Cl, Br, I, or OH, preferably is an esterified OH-group, e.g., of an acid named above, especially an alkyl- or arylsulfonic acid ester group of up to 10 carbon atoms, e.g., methanesulfonyloxy, p-toluenesulfonyloxy and 1-naphthylsulfonyloxy.

The process of this invention can be conducted under reducing conditions employing starting compounds otherwise corresponding to Formula II or III, but which contain, in place of one or two —CHX groups, carbonyl groups, e.g., aldehydes, ketones or esters which are reduced to —CHOH— groups under appropriate conditions.

The piperidines of Formula I, especially the straight-chain piperidines, are preferably obtained by reacting the compounds of Formula II wherein $X_1 = X$ with 4-aryl-piperidines of Formula III wherein $X_2$ and $X_3$ collectively are NH; denoted by IIIa hereinbelow. The compounds of Formula II are largely known, or they can readily be produced analogously to known compounds. Primary alcohols (II, X = OH) can be obtained, for example, by reduction of the corresponding carboxylic acids or esters thereof. Secondary and tertiary alcohols can be produced from the corresponding ketones by reduction or reaction with organometallic compounds. Higher primary alcohols (II, X = OH) of a longer chain length can be obtained from lower alcohols (II, X = OH) by chain lengthening, for example in the following manner: $ZCH_2CH_2OH \rightarrow ZCH_2CH_2Br \rightarrow ZCH_2CH_2MgBr \rightarrow$ (with ethylene oxide) $ZCH_2CH_2CH_2CH_2OH \rightarrow$ (three stages, analogously) $Z(CH_2)_6OH$.

Treatment with thionyl chloride, hydrogen bromide, phosphorus tribromide, or similar halogen compounds yields the corresponding halogenides (II, $X_1$ = Cl or Br). The iodine compounds are obtained, for example, by treating the corresponding p-toluenesulfonic acid esters with potassium iodide. The sulfonyloxy compounds are obtainable from the alcohols Z—A—OH by reaction with the corresponding acid chlorides. The amines Z—A—$NH_2$ can be obtained, for example, from the halogenides with potassium phthalimide or by reduction of the corresponding nitriles.

The aryl-piperidines IIIa are known, for the most part, and can be obtained, for example, by reacting 4-piperidone with organometallic compounds of the formula M—Ar (IX) with subsequent hydrolysis to the 4-aryl-4-hydroxy-piperidines, as well as optionally by subsequent dehydration to 4-aryl-3,4-dehydro-piperidines and hydrogenation to 4-aryl-piperidines. Compounds of Formula III wherein $X_2$ and $X_3$ each are X can be produced for example, by reducing arylglutaric esters to 3-aryl-1,5-pentanediols and optionally subsequent reaction with $SOCl_2$ and/or $PBr_3$.

The reaction of compounds II and III takes place in accordance with methods known from the literature for the alkylation of amines. For example, the components can be melted together, in the absence of a solvent, if desired in a sealed tube or in an autoclave. However, it is also possible to react the compounds in the presence of an inert solvent. Suitable inert solvents include, for example, hydrocarbons, e.g., benzene, toluene and xylene; ketones, e.g., acetone and butanone; alcohols, e.g., methanol, ethanol, isopropanol and n-butanol; ethers, e.g., tetrahydrofuran or dioxane; amides, e.g., dimethylformamide or N-methylpyrrolidone; and nitriles, e.g., acetonitrile. If desired, mixtures of these solvents with each other or mixtures with water can likewise be employed. The addition of an acid-neutralizing agent is advantageous, for example a hydroxide, carbonate, bicarbonate, or another salt of a weak acid of the alkali metals or of the alkaline earth metals, preferably those of potassium, sodium or calcium, or the addition of an organic base, e.g., triethylamine, dimethylaniline, pyridine, or quinoline, or of an excess of an amine component Z—A—$NH_2$ or of the piperidine derivative of Formula IIIa. The reaction time ranges between several minutes and 14 days, depending on the conditions employed. Reaction temperatures range between 0° and 200° C., normally 100°–130° C. When conducting the reaction without solvents at about 120° C., the procedure is terminated within approximately one-half to two hours. In case solvents are employed, heating for 12–24 hours is sometimes necessary in order to attain good yields.

In accordance with a modification of the above-mentioned method, it is possible to react a compound otherwise corresponding to Formula II or III but which contains a carbonyl group in place of a —CHX-group, especially an aldehyde of the formula Z—$C_mH_{2m}$—CHO ($m$ = 0 to 5), with an amine of the formula Z—A—$NH_2$ or of Formula IIIa under the conditions of a catalytic hydrogenation. The reaction conditions correspond to those known from the literature for reductive alkylations. The corresponding aldehyde-ammonia compounds are presumbly produced as the intermediates. The aforementioned carbonyl compounds, especially the above-disclosed aldehydes, are obtainable, for example, by oxidation of the corresponding primary and/or secondary alcohols of Formula II and/or III (X = OH), or by hydrogenation of the corresponding acid chlorides in the presence of Pd/$BaSO_4$ catalysts.

A reaction of nitriles of Formula IV with organometallic compounds of Formula V, preferably Grignard compounds of the formula $R_1$—Mg—Hal, or of piperidones of Formula VIII with organometallic compounds of Formula IX likewise results in the production of compounds of Formula I.

Nitriles of Formula IV can be obtained from the corresponding aldehydes of the formula Z—($C_nH_{2n}$)—CHO by conversion to bisulfite addition product and successive reactions with a 4-aryl-piperidine of Formula IIIa and an alkali metal cyanide, preferably potassium cyanide. Suitable organometallic compounds of Formula V include methylmagnesium bromide, chloride and iodide; ethylmagnesium chloride, bromide and iodide; n-propylmagnesium chloride, bromide and iodide; isopropylmagnesium chloride, bromide and iodide; n-butylmagnesium chloride, bromide and iodide; methyllithium, ethyllithium, n propyllithium, isopropyllithium and n-butyllithium. The piperidines VIII are obtainable, for example, by the reaction of 4-piperidone with halogenides of the formula Z-A-Hal. Preferred organometallic compounds of Formula IX are phenyllithium, phenylmagnesium chloride, bromide and iodide, as well as the corresponding o-, m- and p-tolylphenyl, and o-, m- and p-methoxyphenyl compounds.

The nitriles IV and the piperidones VIII are reacted with the organometallic compounds V or IX, respectively, usually by gradually adding the nitrile or piperidone, either in solution or in solid form, to a solution of the organometallic compound, optionally with cooling, and then heating or refluxing the thus-obtained mixture until the reaction is terminated. Preferred solvents include ethers, e.g., diethyl ether, diisopropyl ether and tetrahydrofuran; also anisole, dibenzyl ether and dioxane; hydrocarbons, e.g., benzene and toluene; or chlorinated hydrocarbons, e.g., methylene chloride. Also suitable are higher ethers or hydrocarbons, as well as mixtures of these solvents with one another. In some cases, it is advantageous to add inorganic salts, such as magnesium bromide or copper(I) chloride. The reaction time and temperature are not critical; ordinarily, however, the reaction is effected at temperatures of between 0° C. and the boiling temperature of the solvent employed and is terminated after ½ to 48 hours, preferably after refluxing for 4 to 6 hours. The reaction product is worked up by hydrolyzing the mixture, for example with water, dilute acid or ammonium chloride solution, and subsequently isolating the bases or salts thereof.

Compounds of Formula VI are usually reacted with hydrazines and/or thioamides of the Formula VII in an inert organic solvent, for example, a hydrocarbon, e.g., benzene; an alcohol, e.g., methanol, ethanol, or ethylene glycol; an ether, e.g., tetrahydrofuran or dioxane; or an amide, e.g., dimethylformamide or N-methylpyrrolidone, at a temperature of between 0° and 200° C., preferably at the boiling temperature of the solvent, and optionally under pressure. Suitable functional derivatives in place of VI include the associated mono- and diketals, preferably the lower-alkanols and lower-alkylenediols, particularly the ethylene ketals, the mono- and di-enolacylates, especially the enolacetates and other enol-alkanoates wherein the alkanoyl group contains up to six carbon atoms, mono- and di-enol ethers, particularly mono- or di-alkyl-enol ethers wherein each alkyl group contains up to 6 carbon atoms, for example, mono- and di-methyl- and -ethyl-enol ethers, mono- or di-enamines (e.g. of ammonia, pyrrolidine, piperidine, morpholine, or enamines derived from IIIa). Suitable functional derivatives of VII include the corresponding N-acyl derivatives wherein the acyl group preferably contains up to seven carbon atoms, particularly the acyl-hydrazides of the formula $R_4$—NH—NH—acyl. Suitable compounds of Formula VII are advantageously hydrazine, the hydrate thereof, methyl-, ethyl-, n-propyl-, isopropyl-, n-butyl- and isobutylhydrazine and the acid addition salts thereof, preferably the hydrochlorides, thioformamide, thiacetamide, thiopropionamide, thiobutyramide, thioisobutyramide, thiovaleramide, and thioisovaleramide.

3,4-Dehydropiperidine derivatives of Formula I ($B_1$ and $B_2$ collectively are a C—C bond) are also obtained by splitting off HE from compounds of Formula X with the formation of a double bond. In accordance with the definition of E, this can involve, for example, the splitting off of hydrogen halide, a molecule of water (dehydration), a carboxylic or other acid, or ammonia.

When E = Hal, this substituent can readily be eliminated under alkaline reaction conditions. Suitable bases include alkali metal hydroxides; alkali metal carbonates; alcoholates, such as, for example, potassium tert.-butylate; and amines, such as, for example, dimethylaniline, pyridine, collidine and quinoline. Examples of suitable solvents include benzene, toluene, cyclohexane, methanol, dioxane, tetrahydrofuran, dimethylformamide and tert.-butanol. Amines used as the bases can also be present in excess to function as solvents. If one of the E groups is an OH-group, the agents for splitting off water are preferably $POCl_3$, polyphosphoric acid, formic acid, perchloric acid, acetic anhydride, $SOCl_2$, $P_2O_5$, molecular sieves, and sintered aluminum oxides, as well as other dehydrating oxides, e.g., $SiO_2$ and $KHSO_4$. The addition of a solvent can be advantageous The water can also be split off by acid catalysis with azeotropic removal of the thus-formed water. The elimination of alkyl-, acyl-, alkylsulfonyl-, as well as alkoxysulfonyloxy or amino residues can be conducted under similar conditions.

The elimination of sulfonic acid residues, for example mesylates and tosylates, can be effected in a gentle manner by boiling in dimethylformamide or diemethyl sulfoxide with alkali metal carbonates, e.g., $Li_2CO_3$, or with potassium acetate. Ammonia can be split off by heating the salts of the corresponding amino compounds, especially the 4-amino derivatives. Deamination can also be conducted by pyrolsis of the phenylthiourea derivatives, obtainable with phenyl mustard oil, or enzymatically. The elimination of HE from X is generally effected at temperatures of between 0° and 250° C., preferably between 50° and 200° C. For this purpose, reaction times of 10 minutes to 4 days are generally required.

The products of Formula I can also be prepared by treating a tetrahydro-1,3-oxazine of Formula XI with an acid, for example with hydrochloric acid, hydrobromic acid, hydriodic acid, sulfuric acid, or perchloric acid. The process is advantageously conducted at temperatures of between room temperature and boiling temperature, particularly between 60° and 120°C., in an aqueous or aqueous-alcohol medium. Reaction times of between 1 hour and 14 days are usually required. Under gentler conditions, for example, in more dilute acid, e.g., 20 percent strength hydrochloric acid, and short reaction times, the 4-piperidinols I ($B_1 = H$, $B_2 = OH$) are obtained, which can be readily dehydrated to the 3,4-dehydropiperidines I ($B_1$ and $B_2$ together $= C—C$ bond). Higher yields of the last-mentioned compounds are obtained if the reaction is conducted under more vigorous conditions, for example with concentrated hydrochloric acid at 100°C. The starting substances XI are prepared, for example, by reacting α-methylstyrene (or derivatives thereof substituted in the phenyl nucleus) with 2 mols of formaldehyde and 1 mol of $Z—A—NH_2$. The thus-produced reaction mixture can also be treated directly with an acid, with compounds XI not being isolated.

It is also possible to obtain a compound of Formula I by starting with a preliminary product which contains, in addition to or in place of hydrogen atoms, one or more reducible groups, C=C or C=N double bonds and/or C $\equiv$ C triple bonds, and treating this preliminary product with a reducing agent, preferably at a temperature of between −80° C. and +250° C. in the presence of at least one inert solvent.

Reducible groups, i.e., groups replaceable by hydrogen, include Cl, Br, I; oxygen in an N-oxy, epoxy or carbonyl group; sulfur in a thiocarbonyl groupl hydroxyl; mercapto; amino; hydroxyl, mercapto, hydrocarbon substituted amino; and N-benzyl groups. Compounds containing only one of the aforementioned groups or multiple bonds or containing two or more of the aforementioned groups of multiple bonds can be converted into a compound of Formula I by reduction thereof. Preferably, catalytically activated or nascent hydrogen or complex metal hydrides are utilized for this purpose; a Clemmensen or Wolff-Kishner reduction can also be employed in this connection.

For example, chlorine or bromine atoms on the phenyl ring or on the ring of group Z or in the chain can be removed by catalytic hydrogenolysis or by treatment with chemical reducing agents and replaced by hydrogen.

Pyridinium salts of the formula

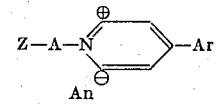

wherein $An^\ominus$ represents an anion, preferably $Cl^\ominus$ or $Br^\ominus$, can be reduced to compounds of Formula I, optionally either in stages, e.g., with $NaBH_4$ to the corresponding 3,4-dehydropiperidine, followed by catalytic hydrogenation or in one step by catalytic hydrogenation.

Compounds containing an aldehyde-ammonia, keto, amide or lactam group in the piperidine ring or in the alkylene chain can be reduced to form compounds of Formula I. It is possible, for example, to react 4-aryl-piperidines of the Formula IIIa with acid halogenides of the formula $Z—C_mH_{2m}—COHal$, which optionally can contain one or more double bonds in the alkylene chain, to the corresponding amides, the carbonyl function of which can then be reduced with complex hydrides, such as lithium aluminum hydride or sodium bis(2-methoxyethoxy) aluminum dihydride, and the double bonds of which can be reduced by catalytic hydrogenation. Ketones of the formula $Z—CO—R'$ ($R'$ representing the remainder of the molecule otherwise corresponding to Formula I are obtainable, for example, by the reaction of nitriles of the formula $Z—CN$ with organometallic compounds of the formula $M—R'$, which in turn, can be produced by alkylating 4-aryl-piperidines of Formula IIIa with, for example, dihaloalkanes, such as 1-bromo-3-chloropropane, and subsequent metalizing. Other ketones suitable as starting substances for the reduction can be produced by reacting compounds of Formula IIIa with, for example, chloroacetonitrile, bromoacetonitrile, or acrylonitrile and reaction of the thus-obtained 1-(ω-cyanoalkyl)-4-aryl-piperidines with organometallic compounds, e.g., 3,4-methylenedioxybenzyllithium.

These ketones can be converted into the compounds of Formula I by hydrogenation or by a Wolff-Kishner reaction. It is also possible to conduct the reaction in stages. For example, the ketones can be converted, prior to the hydrogenation, into the thioketals; or they can be reduced to the corresponding carbinols, the latter can be dehyrated, and the thus-obtained olefinic compounds, corresponding to Formula I but containing a double bond in the side chain, can then be hydrogenated.

For catalytic hydrogenations, it is possible to employ conventional catalysts, such as the noble metal, nickel, and cobalt catalysts. For the reduction of carboxylic acid derivatives, it is also possible to use mixed catalysts, e.g., copper chromium oxide. The nobel metal catalysts can be employed on supports, e.g., platinum or palladium on charcoal, palladium on calcium carbonate or strontium carbonate, as oxide catalysts, e.g., platinum oxide, or as finely divided metallic catalysts. Nickel and cobalt catalysts are suitably employed as Raney metals. Nickel can also be employed on kieselguhr or pumice as the support. Hydrogenation can be effected at room temperature and under normal pressure, or at elevated temperature or under increased pressure. Preferably, the process is conducted under a pressure of between 1 and 100 atmospheres and at a temperature of between −80° C. and +150° C., preferably between room temperature and +100° C. The reaction can be conducted in an acidic, neutral or basic range and in the presence of a solvent, e.g., water, methanol, ethanol, isopropanol, n-butanol, ethyl acetate, dioxane, acetic acid and tetrahydrofuran or a mixture thereof.

For purposes of hydrogenation, the free bases or the corresponding acid addition salts can be used, for example, the hydrochlorides. Although hydrogenation conditions must be selected so that the aromatic or heteroaromatic systems are not likewise attacked thereby, this is easily accomplished. For example, in the hydrogenation of multiple bonds, the reaction is preferably conducted under normal pressure in such a manner that the hydrogenation is terminated after the stoichiometric amount of hydrogen has been absorbed.

If nascent hydrogen is utilized as the reducing agent, the hydrogen can be produced, for example, by treating metals with acids or bases. Thus, it is possible, for example, to employ a mixture of zinc with acid or an alkali liquor, of iron with hydrochloric acid or acetic acid, or of tin with hydrochloric acid. Also suitable is the use of sodium or another alkali metal in an alcohol, e.g., ethanol, isopropanol, butanol, amyl alcohol, isoamyl alcohol and phenol. An aluminum-nickel alloy can be used in an alkaline-aqueous solution, optionally with the addition of ethanol. Also, sodium amalgam or aluminum amalgam in an aqueous-alcoholic or an aqueous solution is suitable for producing nascent hydrogen. The reaction can also be conducted in a heterogeneous phase, advantageously using an aqueous phase and a benzene or toluene phase. The reaction temperatures in this process range, for example, between room temperature and the boiling point of the solvent employed.

As the reducing agents, it is furthermore possible to use complex metal hydrides, e.g., LiAlH$_4$, optionally with the addition of a catalyst, e.g., BF$_3$, AlCl$_3$ and LiBr. The reaction is advantageously conducted in the presence of an inert solvent, e.g., ether, tetrahydrofuran, di-n-butyl ether and ethylene glycol dimethyl ether. Advantageously, the reduction is conducted between −80° C. and the boiling point of the solvent. The thus-formed metal complexes can be decomposed in the usual manner, e.g., with moist ether or with an aqueous ammonium chloride solution.

N-Benzyl groups can also be reductively split off with sodium in liquid ammonia.

It is furthermore possible to reduce one or several carbonyl groups to CH$_2$-groups in accordance with the methods of Clemmensen and Wolff-Kishner. In the reduction according to Clemmensen, the carbonyl compounds are treated, for example, with a mixture of zinc and hydrochloric acid, amalgamated zinc and hydrochloric acid, or tin and hydrochloric acid, either in an aqueous-alcoholic solution or in the heterogeneous phase with a mixture of water and benzene or toluene. The reaction is easily terminated by boiling the reaction mixture. The metal can either be added first and the acid added thereto dropwise, or conversely, the acid can be added first and the metal can be added thereto in portions. The reduction according to Wolff-Kishner can be effected by treating the carbonyl compounds with anhydrous hydrazine in absolute ethanol in an autoclave or sealed tube, wherein the reaction temperatures can be increased to 250° C. As the catalyst, sodium alcoholate is advantageously employed. The reduction can also be varied in accordance with the method of Huang-Minlon, by conducting the reaction with hydrazine hydrate as the reducing agent in a high-boiling, water-miscible solvent, e.g., diethylene glycol or triethylene glycol, and in the presence of an alkali, e.g., sodium hydroxide. The reaction mixture is normally refluxed for about 3–4 hours. Thereafter, the water is distilled off, and the thus-formed hydrazone is decomposed at temperatures of up to about 200° C.

The Wolff-Kishner reduction can also be conducted with hydrazine at room temperature in dimethyl sulfoxide.

Functional derivatives of compounds of Formula I which otherwise correspond to Formula I but which contain, in place of at least one H atom or an OH-group, a group which can be split off by solvolysis, can be solvolyzed, especially hydrolyzed, to compounds of Formula I in accordance with methods described in the literature. For example, it is possible to convert N-acyl-pyrazolyl derivatives, wherein the acyl group preferably contains 1–10 carbon atoms, into the corresponding pyrazole derivatives which are unsubstituted in the 1-position of the pyrazole ring; and esters or halogen derivatives of Formula I (B$_1$ or B$_2$ = O-acyl or Hal) can be converted into hydroxypiperidine compounds of Formula I (B$_1$ or B$_2$ = OH). Hydrolysis can be effected in an acidic, neutral, or alkaline medium at temperatures of between 0° C. and 200° C., preferably at the boiling temperature of the selected solvent. Suitable acidic catalysts include hydrochloric acid, sulfuric acid, phosphoric acid and hydrobromic acid. Suitable alkaline catalysts include sodium hydroxide, potassium hydroxide, calcium hydroxide, sodium or potassium carbonate and ammonia. Water is preferably employed as the solvent. Other preferred solvents include lower alcohols, e.g., methanol and ethanol; ethers, e.g., tetrahydrofuran and dioxane; amides, e.g., dimethylformamide; nitriles, e.g., acetonitrile; sulfones, e.g., tetramethylenesulfone; and mixtures thereof, especially mixtures containing water. Hydrolysis takes place during treatment with water alone, especially boiling water, in this manner, tertiary halogen atoms (e.g., compounds of Formula I containing Cl or Br in place of B$_2$) can readily be split off, forming the corresponding carbinols. The required reaction times generally range between 1 hour and 14 days.

Analogously, groups which can be split off by solvolysis can also be removed by alcoholysis, ammonolysis or aminolysis.

Compounds otherwise corresponding to Formula I containing one or more amino groups in place of at least one halogen atom or one OH-group can be diazotized and subsequently substituted by halogen or OH, respectively. These reactions are suitably conducted in accordance with the methods described in the literature. Thus, an amino group present in the residue Ar can be diazotized with a salt, e.g., $NaNO_2$, or a lower ester of nitrous acid, e.g., butyl nitrite, preferably in an aqueous-hydrochloric solution at temperatures of between −10° C. and +20° C. Thereafter, the diazonium chloride group is exchanged by chlorine, suitably according to the method of Sandmeyer, with $Cu_2Cl_2$ in a boiling aqueous medium. An amino group present in place of $B_1$ or $B_2$ in a compound otherwise corresponding to Formula I can be converted into a hydroxy group by diazotization, such as under the above-mentioned conditions, and subsequent heating until nitrogen evolution terminates.

Additionally, a 3,4-dehydro-piperidine derivative of Formula I ($B_1$ and $B_2$ = together a C—C bond) can be hydrated, thus obtaining a 3-hydroxy compound of Formula I ($B_1$ = OH, $B_2$ = H) or a 4-hydroxy compound of Formula I ($B_1$ = H, $B_2$ = OH). The 3-hydroxy compounds are formed, for example, by hydroboration of the 3,4-dehydro-piperidine derivatives with $B_2H_6$ and subsequent oxidation of the thus-obtained organoboron compounds, which correspond to compounds of Formula I, but contain a —$BH_2$ group instead of a $B_1$ group with alkaline $H_2O_2$ solution or a peracid. For this purpose, diborane can be introduced into a solution of the 3,4-dehydro derivative, or produced in situ in the solution. Thus, for example, a complex boron hydride, e.g., $NaBH_4$ or $LiBH_4$, and a Lewis acid, e.g., $BCl_3$, $BF_3$ etherate or $AlCl_3$, are added to a solution of the 3,4-dehydro compound in an inert solvent, e.g., tetrahydrofuran, diethylene glycol dimethyl ether (diglyme), or triethylene glycol dimethyl ether (triglyme), at a temperature of between −b 80° C. and the boiling point of the solvent. The thus-produced organoboron compound is split, optionally after decomposing the excess complex hydride with water, with $H_2O_2$ and the addition of a base, e.g., NaOH, preferably at a temperature of between 20° C. and 60° C. In place of the diborane, it is also possible to employ alkylaluminum compounds which can be added and split by oxidation in an analogous manner.

4-Hydroxy-piperidine derivatives can be obtained from the 3,4-dehydro compounds, for example, by adding hydrogen halide to the 3(4)-double bond, for example, HBr in acetic acid at a temperature of between 0° and 30° C, and hydrolyzing the thus-obtained 4-halogen compound, which need not be isolated, by treatment with water or base.

A compound of Formula I containing a free NH-group can be converted into the corresponding N-acyl derivative with an acylating agent. Suitable acylating agents are, in particular, the corresponding halogenides, e.g., acyl chlorides or bromides, and anhydrides and mixed anhydrides of the respective acids with carbonic acid monoesters, e.g., acetylethyl carbonate, or ketenes. The acylation is advantageously conducted as a solution or suspension. The inert solvents employed include water; alcohols, especially methanol or ethanol; ethers, e.g., diethyl ether, tetrahydrofuran and dioxane; hydrocarbons, e.g., benzene; halogenated hydrocarbons, e.g., 1,2-dichloroethane and chlorobenzene; esters, e.g., ethyl acetate; nitriles, e.g., acetonitrile; amides, e.g., dimethylformamide; and mixtures of these solvents. The reaction is carried out in the presence of a basic catalyst, e.g., an alkali or alkaline earth metal hydroxide, e.g., NaOH, KOH or $Ba(OH)_2$; an alkali metal carbonate, e.g., $K_2CO_3$; or an organic base, e.g., pyridine. The acylation temperature can range between −20° C. and +100° C., preferably between −5° C. and +40° C. It is particularly advantageous to operate under anhydrous conditions and to add the acyl halogenide, for example, dropwise at 0° C. to an anhydrous solution of the NH compound in pyridine. The reaction times vary between 1 hour and 4 days.

If an acid anhydride is utilized as the acylating agent, a hydrochloride of the NH compound can be employed, after adding the stoichiometric amount of sodium acetate, in an aqueous solution or suspension at 40°–60° C. If excess acid anhydride is employed as the solvent, the reaction is often accelerated by the addition of concentrated $H_2SO_4$.

The acylation can also be conducted with esters, e.g., lower-alkyl esters, preferably methyl esters, of the corresponding acids. The reaction is conducted in one of the above-named solvents or in excess ester. The reaction temperatures range preferably between −20° C. and 100° C.

When ketones are used as the acylating agents, the ketene can be added dropwise under ice cooling to an aqueous suspension of the NH compound. However, it is more advantageous to conduct the acylation in an organic solvent at an elevated temperature, for example, by adding the ketene dropwise to a boiling solution of the NH compound in ethylene chloride.

The thus-obtained products of Formula I are isolated from the reaction mixtures, for example by extraction, and normally purified by distillation or crystallization of the bases or the salts thereof, preferably the hydrochlorides thereof. Chromatographic methods are also applicable for isolation and purification purposes.

A piperidine derivative of Formula I obtained according to the process of this invention can be converted into an acid addition salt in the usual manner, desirably using those acids which yield physiologically acceptable acid addition salts. Thus, it is possible to employ organic, preferably of 1–10 carbon atoms, especially carboxylic and sulfonic acids, and inorganic acids, e.g., aliphatic, alicyclic, araliphatic, aromatic, or heterocyclic mono- or poly-basic carboxylic or sulfonic acids, e.g., alkanoic acids, including formic acid, acetic acid, propionic acid, pivalic acid and diethylacetic acid, oxalic acid, malonic acid, succinic acid, pimelic acid, fumaric acid, maleic acid, lactic acid, tartaric acid and malic acid, aminocarboxylic acids, sulfamic acid, benzoic acid, salicylic acid, phenylpropionic acid, citric acid, gluconic acid, ascorbic acid, isonicotinic acid, alkanesulfonic acids, including methane-or ethanesulfonic acid, ethanedisulfonic acid, β-hydroxyethanesulfonic acid, arylsulfonic acids, including benzenesulfonic acid, p-toluenesulfonic acid, naphthalene-mono- and -disulfonic acids, sulfuric acid, nitric acid, hydrohalic acids, e.g., hydrochloric acid and hydrobromic acid and phosphoric acids, e.g., orthophosphoric acid. The free bases of Formula I can, if desired, be obtained from the salts thereof by treatment with a strong base, e.g., sodium hydroxide or potassium hydroxide, or sodium or potassium carbonate.

A base of Formula I can be converted into corresponding quaternary ammonium salts by treatment with a quaternizing agent. Suitable agents for the quaternization include alkylating agents wherein the alkyl group is preferably of one to eight carbon atoms, e.g., methyl chloride, bromide, or iodide, dimethyl sulfate, ethyl chloride, bromide and iodide, diethyl sulfate, propyl, isopropyl and n-butyl chloride, bromide and iodide. The reaction is conducted under standard conditions described in the literature, e.g., by reacting the components in an inert solvent, e.g., ether or a lower alcohol, at a temperature of between 0° and 100° C.

When the compounds of Formula I contain a center of asymmetry, they are ordinarily obtained as a racemic mixture. If the compounds exhibit two or more centers of asymmetry, they are generally obtained during the synthesis as mixtures of racemates from which the individual racemates can be isolated, for example, by repeated recrystallization from suitable solvents and thus can be obtained in the pure form.

Such racemates can be separated into their optical antipodes mechanically or chemically. Preferably, diastereomers are formed from the racemic mixture by reaction with an optically active separating agent. For example, salt diastereomers of the bases of Formula I can be formed with optically active acids, such as D- and L-tartaric acid, dibenzoyl-D- and -L-tartaric acid, diacetyl-D- and -L-tartaric acid, β-camphorsulfonic acid, D- and L-mandelic acid, D- and L-malic acid, or D- and L-lactic acid. The difference in solubility of the diastereomers permits selective crystallization of one form and the regeneration of the corresponding optically active compound of Formula I from the mixture.

It is, of course, possible to obtain optically active compounds in accordance with the above-described methods by the use of starting substances which are already optically active.

The novel compounds of Formula I and the physiologically acceptable acid addition salts and quaternary ammonium salts thereof can be employed in human or veterinary medicine in a mixture with conventional solid, liquid or semiliquid excipients. Useful pharmaceutically acceptable carrier substances are those organic or inorganic materials which are suitable for parenteral, enteral, or topical application and which do not react adversely with the novel compounds, such as, for example, water, vegetable oils, polyethylene glycols, gelatin, lactose, amylose, magnesium stearate, talc, vaseline, cholesterol, etc. For parenteral application, suitable are especially solutions, preferably oily or aqueous solutions, as well as suspensions, emulsions, or implants. For enteral application, there can also be employed tablets, dragees, syrups and elixirs. For topical application, ointments, salves, creams, powders and liquid and solid aerosols can be employed. The aforementioned preparations can optionally be sterilized or mixed with auxiliary agents, e.g., preservatives, stabilizers and wetting agents, salts for influencing osmotic pressure, buffers, coloring agents, flavoring agents and/or aromatic substances.

The compounds of this invention are preferably administered in a dosage of 0.1 – 50 mg. per dosage unit.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, the temperatures are set forth in degrees centigrade.

EXAMPLE 1

(a) 6.5 g. of 4-(2-chloroethyl)-pyrazole [or 8.8 g. of 4-(2-bromoethyl)-pyrazole] and 16.9 g. of 4-phenyl-3,4-dehydropiperidine are mixed and heated to 120°–130°. After the exothermic reaction has faded and the mixture has cooled down, the latter is triturated with ether and the precipitate (hydrochloride of 4-phenyl-3,4-dehydro-piperidine) is filtered. The filtrate is concentrated by evaporation, and the thus-obtained crude 1-[2-(pyrazolyl-4)-ethyl]-4-phenyl-3,4-dehydropiperidine is converted into the monomaleate; m.p. 160°–162°.

Analogously, with 4-phenyl-piperidine, 4-phenyl-3,4-dehydro-piperidine, or 4-p-methoxyphenyl-piperidine, respectively, the compounds set forth below are obtained, namely:

from 3-(2-chloroethyl)-pyrazole:
  1-[2-(pyrazolyl-3)-ethyl]-4-phenyl-piperidine;
  1-[2-(pyrazolyl-3)-ethyl]-4-phenyl-3,4-dehydropiperidine, m.p. 113°; dihydrochloride monohydrate, m.p. 208°–210°;
  1-[2-(pyrazolyl-3)-ethyl]-4-p-methoxyphenyl-piperidine;

from 3-(2-chloroethyl)-5-methyl-pyrazole:
  1-[2-(5-methyl-pyrazolyl-3)-ethyl]-4-phenyl-piperidine, m.p. 103°–104°; dihydrochloride, m.p. 213°–214°;
  1-[2-(5-methyl-pyrazolyl-3)-ethyl]-4-phenyl-3,4-dehydro-piperidine, m.p. 68°; monomaleate, m.p. 134°–136°; monosuccinate, m.p. 110°–111°;
  1-[2-(5-methyl-pyrazolyl-3)-ethyl]-4-p-methoxyphenyl-piperidine;

from 3-(2-chloropropyl)-5-methyl-pyrazole (24 hours at 100°):
  1-[1-(5-methyl-pyrazolyl-3)-propyl-(2)]-4-phenyl-piperidine;
  1-[1-(5-methyl-pyrazolyl-3)-propyl-(2)]-4-phenyl-3,4-dehydro-piperidine;
  1-[1-(5-methyl-pyrazolyl-3)-propyl-(2)]-4-p-methoxyphenyl-piperidine;

from 4-(2-chloroethyl)-pyrazole:
  1-[2-(pyrazolyl-4)-ethyl]-4-phenyl-piperidine, monomaleate, m.p. 160°–162°;
  1-[2-(pyrazolyl-4)-ethyl]-4-p-methoxyphenyl-piperidine;

from 1-methyl-4-(2-chloroethyl)-pyrazole:
  1-[2-(1-methyl-pyrazolyl-4)-ethyl]-4-phenyl-piperidine, monomaleate, m.p. 125°–127°;
  1-[2-(1-methyl-pyrazolyl-4)-ethyl]-4-phenyl-3,4-dehydro-piperidine, monomaleate, m.p. 95°–97°;
  1-[2-(1-methyl-pyrazolyl-4)-ethyl]-4-p-methoxyphenyl-piperidine;

from 1-methyl-4-(3-chloropropyl)-pyrazole:
  1-[3-(1-methyl-pyrazolyl-4)-propyl]-4-phenyl-piperidine; dihydrochloride, m.p. 180°;
  1-[3-(1-methyl-pyrazolyl-4)-propyl]-4-phenyl-3,4-dehydropiperidine;
  1-[3-(1-methyl-pyrazolyl-4)-propyl]-4-p-methoxyphenyl-piperidine;

from 1,3-dimethyl-5-(2-chloroethyl)-pyrazole:
  1-[2-(1,3-dimethyl-pyrazolyl-5)-ethyl]-4-phenyl-piperidine;
  1-[2-(1,3-dimethyl-pyrazolyl-5)-ethyl]-4-phenyl-3,4-dehydropiperidine;
  1-[2-(1,3-dimethyl-pyrazolyl-5)-ethyl]-4-p-methoxyphenyl-piperidine;

from 1,3-dimethyl-5-(2-chloropropyl)-pyrazole (24 hours at 120°):
  1-[1-(1,3-dimethyl-pyrazolyl-5)-propyl-(2)]-4-phenyl-piperidine;
  1-[1-(1,3-dimethyl-pyrazolyl-5)-propyl-(2)]-4-phenyl-3,4-dehydro-piperidine;
  1-[1-(1,3-dimethyl-pyrazolyl-5)-propyl-(2)]-4-methoxyphenyl-piperidine;
from 1,3-dimethyl-5-(4-chlorobutyl)-pyrazole:
  1-[4-(1,3-dimethyl-pyrazolyl-5)-butyl]-4-phenyl-piperidine;
  1-[4-(1,3-dimethyl-pyrazolyl-5)-butyl]-4-phenyl-3,4-dehydropiperidine, dihydrochloride monohydrate, m.p. 196°–198°;
  1-[4-(1,3-dimethyl-pyrazolyl-5)-butyl]-4-p-methoxyphenyl-piperidine;
from 4-methyl-5-(2-chloroethyl)-thiazole:
  1-[2-(4-methyl-thiazolyl-5)-ethyl]-4-phenyl-piperidine, dihydrochloride, m.p. 233° (decomposition; sintering at 211°);
  1-[2-(4-methyl-thiazolyl-5)-ethyl]-4-phenyl-3,4-dehydro-piperidine, dihydrochloride, m.p. 249°–252° (decomposition);
  1-[2-(4-methyl-thiazolyl-5)-ethyl]-4-p-methoxyphenyl-piperidine;
from 2,4-dimethyl-5-(2-chloropropyl)-thiazole (2 hours at 180°):
  1-[1-(2,4-dimethyl-thiazolyl-5)-propyl-(2)]-4-phenyl-piperidine;
  1-[1-(2,4-dimethyl-thiazolyl-5)-propyl-(2)]-4-phenyl-3,4-dehydro-piperidine;
  1-[-(2,4-dimethyl-thiazolyl-5)-propyl-(2)]-4-p-methoxyphenyl-piperidine;
from 2,4-dimethyl-5-(4-chlorobutyl)-thiazole:
  1-[4-(2,4-dimethyl-thiazolyl-5)-butyl]-4-phenyl-piperidine, dihydrochloride, m.p. 186°–188°;
  1-[4-(2,4-dimethyl-thiazolyl-5)-butyl]-4-phenyl-3,4-dehydro-piperidine, dihydrochloride, m.p. 235°–237°;
  1-[4-(2,4-dimethyl-thiazolyl-5)-butyl]-4-p-methoxyphenyl-piperidine;
from 1-(3,4-methylenedioxyphenyl)-2-chloropropane (24 hours at 100°):
  1-(3,4-methylenedioxyphenyl)-2-(4-phenyl-piperidino)-propane, hydrochloride, m.p. 234°–236°;
  1-(3,4-methylenedioxyphenyl)-2-(4phenyl-3,4-dehydro-piperidino)-propane, hydrochloride, no m.p. up to 215°;
  1-(3,4-methylenedioxyphenyl)-2-(4-p-methoxyphenyl-piperidino)-propane;
from 1-(3,4-methylenedioxyphenyl)-4-chlorobutane:
  1-(3,4-methylenedioxyphenyl)-4-(4-phenyl-piperidino)-butane;
  1-(3,4-methylenedioxyphenyl)-4-(4-phenyl-3,4-dehydro-piperidino)-butane;
  1-(3,4-methylenedioxyphenyl)-4-(4-p-methoxyphenyl-piperidino)-butane, monomaleate, m.p. 134°–135°.

In place of the chlorine compounds, it is also possible to employ the corresponding bromine or iodine compounds as the starting substances.

(b) One gram of 1-[2-(5-methyl-pyrazolyl-3)-ethyl]-4-phenyl-3,4-dehydro-piperidine is dissolved in 10 ml. of absolute tetrahydrofuran; the solution is mixed, under cooling, with 0.6 ml. of absolute pyridine and 0.4 ml. of acetyl chloride and allowed to stand for two days at room temperature. The solution is then concentrated by evaporation, dilute solution of sodium hydroxide and ether is added thereto, the mixture is separated, and the ether extract is dried over magnesium sulfate. After evaporation, a mixture is obtained (called "G" hereinbelow) of 1-[2-(1-acetyl-3-methyl-pyrazolyl-5)-ethyl]-4-phenyl-3,4-dehydro-piperidine and 1-[2-(1-acetyl-5-methyl-pyrazolyl-3)-ethyl]-4-phenyl-3,4-dehydro-piperidine. The monomaleate obtained from this mixture melts at 133°.

Analogously, the following compounds are produced from the corresponding pyrazole derivatives unsubstituted in the 1-position:
  1-[2-(1-acetyl-pyrazolyl-3)-ethyl]-4-phenyl-3,4-dehydro-piperidine and
  1-[2-(1-acetyl-pyrazolyl-5)-ethyl]-4-phenyl-3,4-dehydro-piperidine;
  1-[2-(1-acetyl-3-methyl-pyrazolyl-5)-ethyl]-4-phenyl-piperidine and
  1-[2-(1-acetyl-5-methyl-pyrazolyl-3)-ethyl]-4-phenyl-piperidine;
  1[2-(1-acetyl-pyrazolyl-4)-ethyl]-4-phenyl-piperidine;

as well as other 1-acyl derivatives, with the corresponding acid chlorides, bromides, or anhydrides, for example:
  1-[2-(1-propionyl-pyrazolyl-4)-ethyl]-4-phenyl-piperidine;
  1-[2-(1-butyryl-pyrazolyl-4)-ethyl]-4-phenyl-piperidine;
  1-[2-(1-nonanoyl-pyrazolyl-4)-ethyl]-4-phenyl-piperidine;
  1-[2-(1-stearoyl-pyrazolyl-4)-ethyl]-4-phenyl-piperidine;
  1-[2-(1-benzoyl-pyrazolyl-4)-ethyl]-4-phenyl-piperidine;
  1-{2-[1-(3,4,5-trimethoxy-benzoyl)-pyrazolyl-4]-ethyl}-4-phenyl-piperidine;
  1-{2-[1-(p-aminobenzoyl)-pyrazolyl-4]-ethyl}-4-phenyl-piperidine;
  1-[2-(1-cinnamoyl-pyrazolyl-4)-ethyl]-4-phenyl-piperidine;
  1-[2-(1-ethoxycarbonyl-pyrazolyl-4)-ethyl]-4-phenyl-piperidine (with ethyl chloroformate);
  1-[2-(1-dimethylcarbamoyl-pyrazolyl-4)-ethyl]-4-phenyl-piperidine.

(c) Under a nitrogen atmosphere, diborane (produced by adding 30 ml. of 1-molar $NaBH_4$-diglyme solution dropwise to 7.7 ml. of boron trifluoride etherate in 7 ml. of diglyme and subsequent heating for 1 hour to 80° in a separate generator under agitation) is introduced into a solution of 26.7 g. of 1-[2-(5-methyl-pyrazolyl-3)-ethyl]-4-phenyl-3,4-dehydro-piperidine in 200 ml. of tetrahydrofuran. Then, excess hydride is gently decomposed with water; the mixture is mixed with 11 ml. of 3N sodium hydroxide solution and dropwise, under vigorous stirring, at 50° with 11 ml. of 30 percent strength hydrogen peroxide, and is thereafter agitated for another hour. After the addition of water, the mixture is extracted with chloroform, and the evaporated extract is chromatographed, thus obtaining 1-[2-(5-methyl-pyrazolyl-3)-ethyl]-3-hydroxy-4-phenyl-piperidine.

EXAMPLE 2

(a) 1.89 g. of 3-(2-bromoethyl)-5-methyl-pyrazole and 1.59 g. of 4-phenyl-3,4-dehydro-piperidine ae refluxed in 25 ml. of n-butanol in the presence of 1.5 g. of anhydrous potassium carbonate and 0.2 g. of potassium iodide for 20 hours under agitation. The reaction mixture is allowed to cool, filtered off from the separated salts, evaporated, and the product thus obtained is 1-[2-(5-methyl-pyrazolyl-3)-ethyl]-4-phenyl-3,4-dehydropiperidine, m.p. 68° (from ether).

Analogously, the compounds set forth below are produced with 4-o-tolyl-, 4-m-tolyl-, 4-p-tolyl-, 4-p-n-butylphenyl-, 4-p-n-butoxyphenyl-, 4-o-fluorophenyl-, 4-m-fluorophenyl-, 4-p-fluorophenyl-, 4-o-chlorophenyl-, 4-m-bromophenyl-, 4-p-iodophenyl-, 4-(3,5-dichlorophenyl)-piperidine, or with the corresponding 3,4-dehydro-piperidine derivatives (e.g. 4-m-tolyl-3,4-dehydro-piperidine):

1-[2-(5-methyl-pyrazolyl-3)-ethyl]-4-o-tolyl-piperidine,
1-[2-(5-methyl-pyrazolyl-3)-ethyl]-4-m-tolyl-piperidine,
1-[2-(5-methyl-pyrazolyl-3)-ethyl]-4-p-tolyl-piperidine,
1-[2-(5-methyl-pyrazolyl-3)-ethyl]-4-p-n-butylphenyl-piperidine,
1-[2-(5-methyl-pyrazolyl-3)-ethyl]-4-p-n-butoxyphenyl-piperidine,
1-[2-(5-methyl-pyrazolyl-3)-ethyl]-4-o-fluorophenyl-piperidine,
1-[2-(5-methyl-pyrazolyl-3)-ethyl]-4-m-fluorophenyl-piperidine,
1-[2-(5-methyl-pyrazolyl-3)-ethyl]-4-p-fluorophenyl-piperidine,
1-[2-(5-methyl-pyrazolyl-3)-ethyl]-4-o-chlorophenyl-piperidine,
1-[2-(5-methyl-pyrazolyl-3)-ethyl]-4-m-bromophenyl-piperidine,
1-[2-(5-methyl-pyrazolyl-3)-ethyl]-4-p-iodophenyl-piperidine,
1-[2-(5-methyl-pyrazolyl-3)-ethyl]-4-(3,5-dichlorophenyl)-piperidine;

as well as the corresponding 3,4-dehydro-piperidine derivatives, for example:

1-[2-(5-methyl-pyrazolyl-3)-ethyl]-4-m-tolyl-3,4-dehydro-piperidine, dihydrochloride, m.p. 218°-220°.

Analogously, 1-[2-(5-methyl-pyrazolyl-3)-ethyl]-4-phenyl-piperidine, m.p. 103°-104°, is obtained from 4-phenyl-piperidine and 3-(2-bromoethyl)-5-methyl-pyrazole by refluxing for 5 hours with anhydrous sodium carbonate in amyl alcohol.

(b) One gram of 1-[2-(5-methyl-pyrazolyl-3)-ethyl]-4-phenyl-3,4-dehydro-piperidine is dissolved in 5 ml. of acetonitrile and allowed to stand with 5 ml. of methyl iodide for 7 days at room temperature. After evaporation, the methoiodide of the starting compound is obtained.

In an analogous manner, the methochlorides, methobromides, methoiodides, ethochlorides, ethobromides, and ethoiodides of the starting compound and of the remaining piperidine derivatives of Formula I set forth in Examples 1 through 4 can be produced.

EXAMPLE 3

2.36 g. of 3-(2-iodoethyl)-5-methyl-pyrazole and 3.18 g. of 4-phenyl-3,4-dehydro-piperidine are refluxed under agitation for 3 hours in 30 ml. of acetonitrile. After cooling, the thus-precipitated hydroiodide of the basic starting compound is filtered, the filtrate is evaporated, and the thus-produced crude 1-[2-(5-methyl-pyrazolyl-3)-ethyl]-4-phenyl-3,4-dehydro-piperidine is purified by way of the maleate (m.p. 134°-136°); m.p. 68°.

Analogously, 1-[1-(5-methyl-pyrazolyl-3)-propyl-(2)]-4-phenyl-3,4-dehydro-piperidine is produced from 2.03 g. of 3-(2-bromopropyl)-5-methyl-pyrazole and 3.18 g. of 4-phenyl-3,4-dehydro-piperidine in 30 ml. of N-methylpyrrolidone (48 hours at a bath temperature of 120°).

In an analogous manner, using the following starting compounds:

3,4-methylenedioxybenzyl bromide
1-(3,4-methylenedioxyphenyl)-2-bromoethane
3-(2-bromopropyl)-pyrazole
3-(4-bromobutyl)-pyrazole
1-methyl-3-(2-bromoethyl)-pyrazole
3-(4-bromobutyl)-5-methyl-pyrazole
3-(2-bromoethyl)-5-ethyl-pyrazole
1,5-dimethyl-3-(2-bromoethyl)-pyrazole
1,3-dimethyl-5-(2-bromoethyl)-pyrazole
5-(2-bromoethyl)-thiazole
2,4-dimethyl-5-(2-bromoethyl)-thiazole the compounds set forth below are produced by reaction with 4-phenyl-piperidine:

1-(3,4-methylenedioxybenzyl)-4-phenyl-piperidine
1-(3,4-methylenedioxyphenyl)-2-(4-phenyl-piperdino)-ethane
1-[1-(pyrazolyl-3)-propyl-(2)]-4-phenyl-piperidine
1-[4-(pyrazolyl-3)-butyl]-4-phenyl-piperidine
1-[2-(1-methyl-pyrazolyl-3)-ethyl]-4-phenyl-piperidine
1-[4-(5-methyl-pyrazolyl-3)-butyl]-4-phenyl-piperidine
1-[2-(5-ethyl-pyrazolyl-3)-ethyl]-4-phenyl-piperidine
1-[2-(1,5-dimethyl-pyrazolyl-3)-ethyl]-4-phenyl-piperidine
1-[2-(1,3-dimethyl-pyrazolyl-5)-ethyl]-4-phenyl-piperidine
1-[2-(thiazolyl-5)-ethyl]-4-phenyl-piperidine
1-[2-(2,4-dimethyl-thiazolyl-5)-ethyl]-4-phenyl-piperidine.

EXAMPLE 4

Analogously to Example 3, the compounds set forth hereinbelow are obtained from m-chlorophenyl-piperidine and p-chlorophenyl-piperidine, respectively, by reaction with the starting substances mentioned in Example 1:

1-[2-(pyrazolyl-3)-ethyl]-4-m-chlorophenyl-piperidine
1-[2-(pyrazolyl-3)-ethyl]-4-p-chlorophenyl-piperidine
1-[2-(5-methyl-pyrazolyl-3)-ethyl]-4-m-chlorophenyl-piperidine
1-[2-(5-methyl-pyrazolyl-3)-ethyl]-4-p-chlorophenyl-piperidine
1-[1-(5-methyl-pyrazolyl-3)-propyl-(2)]-4-m-chlorophenyl-piperidine
1-[1-(5-methyl-pyrazolyl-3)-propyl-(2)]-4-p-chlorophenyl-piperidine
1-[2-(pyrazolyl-4)-ethyl]-4-m-chlorophenyl-piperidine
1-[2-(pyrazolyl-4)-ethyl]-4-p-chlorophenyl-piperidine 1-[2-(1-methyl-pyrazolyl-4)-ethyl]-4-m-chlorophenyl-piperidine
1-[2-(1-methyl-pyrazolyl-4)-ethyl]-4-p-chlorophenyl-piperidine 1-[3-(1-methyl-pyrazolyl-4)-propyl]-4-m-chlorophenyl-piperidine
1-[3-(1-methyl-pyrazolyl-4)-propyl]-4-p-chlorophenyl-piperidine
1-[2-(1,3-dimethyl-pyrazolyl-5)-ethyl]-4-m-chlorophenyl-piperidine
1-[2-(1,3-dimethyl-pyrazolyl-5)-ethyl]-4-p-chlorophenyl-piperidine
1-[1-(1,3-dimethyl-pyrazolyl-5)-propyl-(2)]-4-m-chlorophenyl-piperidine
1-[1-(1,3-dimethyl-pyrazolyl-5)-propyl-(2)]-4-p-chlorophenyl-piperidine
1-[4-(1,3-dimethyl-pyrazolyl-5)-butyl]-4-m-chlorophenyl-piperidine
1-[4-(1,3-dimethyl-pyrazolyl-5)-butyl]-4-p-chlorophenyl-piperidine
1-[2-(4-methyl-thiazolyl-5)-ethyl]-4-m-chlorophenyl-piperidine
1-[2-(4-methyl-thiazolyl-5)-ethyl]-4-p-chlorophenyl-piperidine
1-[4-(2,4-dimethyl-thiazolyl-5)-butyl]-4-m-chlorophenyl-piperidine
1-[4-(2,4-dimethyl-thiazolyl-5)-butyl]-4-p-chlorophenyl-piperidine
1-[1-(2,4-dimethyl-thiazolyl-5)-propyl-(2)]-4-m-chlorophenyl-piperidine
1-[1-(2,4-dimethyl-thiazolyl-5)-propyl-(2)]-4-p-chlorophenyl-piperidine
1-(3,4-methylenedioxyphenyl)-2-(4-m-chlorophenyl-piperidino)-propane
1-(3,4-methylenedioxyphenyl)-2-(4-p-chlorophenyl-piperidino)-propane
1-(3,4-methylenedioxyphenyl)-4-(4-m-chlorophenyl-piperidino)-butane
1-(3,4-methylenedioxyphenyl)-4-(4-p-chlorophenyl-piperidino)-butane.

EXAMPLE 5

(a) Analogously to Example 3, by reaction of a mixture of 1-acetyl-3-(2-chloroethyl)-5-methyl-pyrazole and 1-acetyl-3-methyl-5-(2-chloroethyl)-pyrazole with 4-phenyl-3,4-dehydro-piperidine, the mixture is obtained which is described in Example 1(b) and called "G" therein (monomaleate, m.p. 133°).

(b) 0.5 g. of mixture G is refluxed for 2 hours with 50 ml. of 5 percent methanolic potassium hydroxide solution. The mixture is then evaporated, mixed with water, extracted with methylene chloride, separated, dried, again concentrated by evaporation, and the product thus obtained is 1-[2-(5-methyl-pyrazolyl-3)-ethyl]-4-phenyl-3,4-dehydro-piperidine, m.p. 68°.

(c) One gram of mixture G is heated with 50 ml. of 20 percent aqueous hydrochloric acid for 90 minutes to 100°. Sodium carbonate is added to the mixture up to a pH of 10, and then the mixture is extracted with ether, dried, and evaporated, thus producing 1-[2-(5-methyl-pyrazolyl-3)-ethyl]-4-phenyl-3,4-dehydro-piperidine, m.p. 68°.

EXAMPLE 6

12.4 g. of (1-methyl-pyrazolyl-4)-acetaldehyde and 30 g. of 4-phenyl-piperidine are dissolved in 100 ml. of methanol and hydrogenated in the presence of 20 g. of Raney nickel at 100 atmospheres and a temperature of 106° until the hydrogen absorption is terminated. 1-[2-(1-Methyl-pyrazolyl-4)-1-hydroxyethyl]-4-phenyl-piperidine is formed as an intermediate; however, this compound is not isolated. After filtering the catalyst and removing the solvent by evaporation, the residue is taken up in ether and extracted with hydrochloric acid. From the acidic extract, the bases are separated by the addition of sodium hydroxide solution, taken up in ether, and distilled after the solvent has been eliminated by evaporation. After a first run of 4-phenyl-piperidine, 1-[2-(1-methyl-pyrazolyl-4)-ethyl]-4-phenyl-piperidine is obtained; maleate, m.p. 125°–127°.

Analogously, the compounds set forth in Example 1, which are saturated in the piperidine ring, are produced from 4-phenyl- or 4-p-methoxyphenyl-piperidine, respectively, with:
pyrazolyl-3-acetaldehyde
(5-methyl-pyrazolyl-3)-acetaldehyde
(5-methyl-pyrazolyl-3)-acetone
pyrazolyl-4-acetaldehyde
(1-methyl-pyrazolyl-4)-acetaldehyde
(1-methyl-pyrazolyl-4)-acetone
(1,3-dimethyl-pyrazolyl-5)-acetaldehyde
4-(1,3-dimethyl-pyrazolyl-5)-acetone
4-(1,3-dimethyl-pyrazolyl-5)-butanal
(4-methyl-thiazolyl-5)-acetaldehyde
(2,4-dimethyl-thiazolyl-5)-acetone
4-(2,4-dimethyl-thiazolyl-5)-butanal
3,4-methylenedioxyphenyl-acetone
4-(3,4-methylenedioxyphenyl)-butanal.

EXAMPLE 7

10 g. of 1,5-dichloro-3-phenyl-pentane (obtainable by reduction of the diethyl ester of phenylglutar acid with LiAlH$_4$ and reaction with HCl) and 20 g. of 1-methyl-4-(2-aminoethyl)-pyrazole [producible by reacting 1-methyl-4-(2-bromoethyl)-pyrazole with potassium phthalimide and subsequent hydrolysis] are refluxed in a mixture of 400 ml. of acetone and 400 ml. of water for 24 hours. Then, the acetone is distilled off and the aqueous mixture made alkaline with sodium hydroxide solution and extracted with benzene. From the benzene extract, after purification by chromatography, 1-[2-(1-methyl-pyrazolyl-4)-ethyl]-4-phenyl-piperidine is obtained; maleate, m.p. 125°–127°.

Analogously, the compounds set forth in Examples 1, 2, and 4 are produced with 1,5-dichloro-3-phenyl-pentane, 1,5-dichloro-3-phenyl-2-pentene, 1,5-dichloro-3-p-methoxyphenyl-pentane, 1,5-dichloro-3-m-tolyl-pentane, 1,5-dichloro-3-m-tolyl-2-pentene, 1,5-dichloro-3-m-chlorophenyl-pentane, and 1,5-dichloro-3-p-chlorophenyl-pentane, respectively (or with the corresponding 1,5-dibromo compounds), from the following substances:
3-(2-aminoethyl)-pyrazole
3-(2-aminoethyl)-5-methyl-pyrazole
3-(2-aminopropyl)-5-methyl-pyrazole
4-(2-aminoethyl)-pyrazole
1-methyl-4-(2-aminoethyl)-pyrazole
1-methyl-4-(2-aminopropyl)-pyrazole
1,3-dimethyl-5-(2-aminoethyl)-pyrazole
1,3-dimethyl-5-(2-aminopropyl)-pyrazole
1,3-dimethyl-5-(4-aminobutyl)-pyrazole
4-methyl-5-(2-aminoethyl)-thiazole
2,4-dimethyl-5-(2-aminopropyl)-thiazole
2,4-dimethyl-5-(4-aminobutyl)-thiazole 1-(3,4-methylenedioxyphenyl)-2-amino-propane
1-(3,4-methylenedioxyphenyl)-4-amino-butane.

EXAMPLE 8

24 g. of magnesium filings is suspended in 350 ml. of absolute ether and, after activation with a small amount of iodine, converted into the Grignard compound by the introduction of methyl bromide. A solution of 110 g. of 1-(3,4-methylenedioxyphenyl)-2-cyano-2-(4-phenyl-3,4-dehydro-piperidino)-ethane is added dropwise in 750 ml. of absolute benzene to the reaction mixture under agitation. The mixture is refluxed for 5 hours and then decomposed with ice and dilute hydrochloric acid. After rendering the mixture alkaline with ammonia, the organic phase is separated, and the aqueous phase is once again extracted with benzene. The combined organic extracts are dried over magnesium sulfate and concentrated by evaporation. The thus-obtained crude 1-(3,4-methylenedioxyphenyl)-2-(4-phenyl-3,4-dehydro-piperidino)-propane is converted into the hydrochloride (no m.p. up to 215°, from ethanol).

Analogously, the corresponding propyl-(2)-piperidine derivatives set forth in Example 1 are obtained with methylmagnesium bromide or iodide, or with methyllithium from these substances:
  1-[1-cyano-2-(5-methyl-pyrazolyl-3)-ethyl]-4-phenyl-piperidine
  1-[1-cyano-2-(5-methyl-pyrazolyl-3)-ethyl]-4-phenyl-3,4-dehydro-piperidine
  1-[1-cyano-2-(5-methyl-pyrazolyl-3)-ethyl]-4-p-methoxyphenyl-piperidine
  1-[1-cyano-2-(1-methyl-pyrazolyl-4)-ethyl]-4-phenyl-piperidine
  1-[1-cyano-2-(1-methyl-pyrazolyl-4)-ethyl]-4-phenyl-3,4-dehydro-piperidine
  1-[1-cyano-2-(1-methyl-pyrazolyl-4)-ethyl]-4-p-methoxyphenyl-piperidine
  1-[1-cyano-2-(1,3-dimethyl-pyrazolyl-5)-ethyl]-4-phenyl-piperidine
  1-[1-cyano-2-(1,3-dimethyl-pyrazolyl-5)-ethyl]-4-phenyl-3,4-dehydro-piperidine
  1-[1-cyano-2-(1,3-dimethyl-pyrazolyl-5)-ethyl]-4-p-methoxyphenyl-piperidine
  1-[1-cyano-2-(2,4-dimethyl-thiazolyl-5)-ethyl]-4-phenyl-piperidine
  1-[1-cyano-2-(2,4-dimethyl-thiazolyl-5)-ethyl]-4-phenyl-3,4-dehydro-piperidine
  1-[1-cyano-2-(2,4-dimethyl-thiazolyl-5)-ethyl]-4-p-methoxyphenyl-piperidine
  1-(3,4-methylenedioxyphenyl)-2-cyano-2-(4-phenyl-piperidino)-ethane
  1-(3,4-methylenedioxyphenyl)-2-cyano-2-(4-phenyl-3,4-dehydro-piperidino)-ethane
  1-(3,4-methylenedioxyphenyl)-2-cyano-2-(4-p-methoxyphenyl-piperidino)-ethane.

EXAMPLE 9

From 3.5 g. of magnesium and 21 g. of ethyl iodide, the Grignard compound is produced in 80 ml. of absolute tetrahydrofuran. Under agitation, a solution of 10 g. of 1-(3,4-methylene-dioxyphenyl)-2-cyano-2-(4-phenyl-3,4-dehydro-piperidino)-ethane in 120 ml. of absolute tetrahydrofuran is added thereto, and the mixture is then refluxed for 5 hours. After cooling, the mixture is decomposed with dilute hydrochloric acid and worked up in the usual manner. The thus-obtained crude 1-(3,4-methylene-dioxyphenyl)-2-(4-phenyl-3,4-dehydro-piperidino)-butane is purified via the hydrochloride.

EXAMPLE 10

A solution of 5 g. of 1-(4-phenyl-3,4-dehydro-piperidino)-pentane-2,4-dione (obtainable from 1-bromopentane-2,4-dione with 4-phenyl-3,4-dehydro-piperidine) in 50 ml. of ethanol is added dropwise under agitation to a solution of 8 g. of hydrazine hydrate in 50 ml. of ethanol. The mixture is refluxed for one hour, evaporated, mixed with water, and extracted with benzene. From the evaporated extract, 1-(5-methyl-pyrazolyl-3)-methyl-4-phenyl-3,4-dehydro-piperidine is obtained.

With methylhydrazine, 1-(1,5-dimethyl-pyrazolyl-3)-methyl-4-phenyl-3,4-dehydro-piperidine is analogously obtained.

The corresponding pyrazole derivatives, for example 1-(5-methyl-pyrazolyl-3)-methyl-4-phenyl-piperidine and 1-(1,5-dimethyl-pyrazolyl-3)-methyl-4-phenyl-piperidine are produced in an analogous manner with hydrazine and methylhydrazine, respectively, from the following substances:
  1-(4-phenyl-piperidino)-pentane-2,4-dione
  5-(4-phenyl-piperidino)-pentan-3-on-1-al
  5-(4-phenyl-3,4-dehydro-piperidino)-pentan-3-on-1-al
  5-(4-p-methoxyphenyl-piperidino)-pentan-3-on-1-al 1-(4-phenyl-piperidino)-hexane-3,5-dione
  1-(4-phenyl-3,4-dehydro-piperidino)-hexane-3,5-dione
  1-(4-p-methoxyphenyl-piperidino)-hexane-3,5-dione 1-(4-m-tolyl-3,4-dehydro-piperidino)-hexane-3,5-dione 2-(4-phenyl-piperidino)-heptane-4,6-dione
  2-(4-phenyl-3,4-dehydro-piperidino)-heptane-4,6-dione
  2-(4-p-methoxyphenyl-piperidino)-heptane-4,6-dione 1-(4-phenyl-piperidino)-octane-5,7-dione
  1-(4-phenyl-3,4-dehydro-piperidino)-octane-5,7-dione
  1-(4-p-methoxyphenyl-piperidino)-octane-5,7-dione.

EXAMPLE 11

6 g. of a mixture of 1-(4-phenyl-3,4-dehydro-piperidino)-pentane-2,4-dione-2- and -4-ethylene ketal, obtainable by reacting 1-(4-phenyl-3,4-dehydro-piperidino-pentane-2,4-dione with ethylene glycol, is boiled in 100 ml. of ethanol with 10 g. of hydrazine hydrochloride for 2 hours. After evaporation, the mixture is mixed with aqueous solution of sodium hydroxide and extracted with benzene. From the evaporated residue, 1-(5-methyl-pyrazolyl-3)-methyl-4-phenyl-3,4-dehydro-piperidine is produced.

In place of the mixture used as the starting substance, it is also possible to use the corresponding 2,4-bis-ethylene ketal.

Analogously, the corresponding pyrazole derivatives are obtained from the monoketals or diketals of the dicarbonyl compounds set forth in Example 10.

EXAMPLE 12

8 g. of a mixture of 1-(4-phenyl-piperidino)-4-acetoxy-3-penten-2-one and 1-(4-phenyl-piperidino)-2-acetoxy-2-penten-4-one (producible by reacting 1-(4-phenyl-piperidino)-pentane-2,4-dione with ketene) is mixed in 100 ml. of dioxane, with 16 g. of hydrazine hydrate, maintained for 2 hours at room temperature, and then refluxed for one hour. The usual working-up step yields 1-(5-methyl-pyrazolyl-3)-methyl-4-phenyl-piperidine.

Analogously, the corresponding pyrazole derivatives are obtained from the enolacetates (or other enolacylates) of the dicarbonyl compounds mentioned in Example 10.

EXAMPLE 13

8 g. of hydrazine hydrate is allowed to mix dropwise with a solution of 6 g. of a mixture of 1-(4-phenyl-piperidino)-4-methoxy-3-penten-2-one and 1-(4-phenyl-piperidino)-2-methoxy-2-penten 4-one (obtainable by reacting 1-(4-phenyl-piperidino)-pentane-2,4-dione with diazomethane) in 50 ml. of tetrahydrofuran; thereafter, the reaction mixture is refluxed for one hour. After concentration by evaporation, the thus-obtained 1-(5-methyl-pyrazolyl-3)-methyl-4-phenyl-piperidine is purified by chromatography.

Analogously, the corresponding pyrazole derivatives are produced from the enol ethers of the dicarbonyl compounds set forth in Example 10.

EXAMPLE 14

10 g. of hydrazine hydrate is added to a solution of 5 g. of a mixture of 1-(4-phenyl-piperidino)-4-amino-3-penten-2-one and 1-(4-phenyl-piperidino)-2-amino-2-penten-4-one, obtainable by reacting 1-(4-phenyl-piperidino)-pentane-2,4-dione with $NH_3$, in 60 ml. of dimethylformamide; then, the reaction mixture is heated to 120° for one hour. Thereafter, the mixture is poured onto water, extracted with benzene, and the benzene extract, concentrated by evaporation, is purified by chromatography, thus obtaining 1-(3-methyl-pyrazolyl-5)-methyl-4-phenyl-piperidine.

EXAMPLE 15

5 g. of 1-[2-(4-methyl-pyrimidyl-5)-ethyl]-4-phenyl-piperidine (obtainable from 4-methyl-5-(2-chloroethyl)-pyrimidine and 4-phenyl-piperidine) is heated with 10 g. of hydrazine hydrate and 20 ml. of ethylene glycol in a sealed tube for 5 hours to 180°. Then, the mixture is poured on water, extracted with benzene, and the evaporated benzene phase is chromatographed, thus obtaining 1-[2-(3-methyl-pyrazolyl-4)-ethyl]-4-phenyl-piperidine.

DXAMPLE 16

0.61 g. of thioformamide is heated in 15 ml. of N-methyl-pyrrolidone with 3.24 g. of 3-bromo-5-(4-phenyl-piperidino)-pentan-2-one (obtainable by reacting 5-bromo-2-pentanone with 4-phenyl-piperidine and subsequent bromination with bromine in acetic acid) for 3 hours to a bath temperature of 90°. The mixture is allowed to cool, and dilute hydrochloric acid is added. The phases are separated, and the aqueous phase is rendered alkaline with sodium hydroxide solution and extracted with ether. From the ether extract, 1-[2-(4-methyl-thiazolyl-5)-ethyl]-4-phenyl-piperidine is produced. Dihydrochloride, m.p. 233° (decomposition; sintering at 211°).

Analogously, 1-[2-(2,4-dimethyl-thiazolyl-5)-ethyl]-4-phenyl-piperidine is obtained with thioacetamide; and the corresponding thiazole derivatives are obtained from:

3-bromo-5-(4-phenyl-3,4-dehydro-piperidino)-pentan-2-one
3-bromo-5-(4-p-methoxyphenyl-piperidino)-pentan-2-one
3-bromo-5-(4-phenyl-piperidino)-hexan-2-one
3-bromo-5-(4-phenyl-3,4-dehydro-piperidino)-hexan-2-one  3-bromo-5-(4-p-methoxyphenyl-piperidino)-hexan-2-one
3-bromo-7-(4-phenyl-piperidino)-heptan-2-one  3-bromo-7-(4-phenyl-3,4-dehydro-piperidino)-heptan-2-one
3-bromo-7-(4-p-methoxyphenyl-piperidino)-heptan-2-one or from the corresponding chloroketones.

EXAMPLE 17

A solution of 20.7 g. of 1-[2-(5-methyl-pyrazolyl-3)-ethyl]-piperidone-(4) in 200 ml. of ether is added dropwise to a phenylmagnesium bromide solution of 2.4 g. of magnesium and 16 g. of bromobenzene in 100 ml. of ether, and then the mixture is refluxed for 1 hour under agitation. Thereafter, the mixture is decomposed with dilute sulfuric acid, the acidic phase is separated, heated for one hour on a steam bath and, after cooling, made alkaline with solution of sodium hydroxide. The mixture is extracted with benzene, concentrated by evaporation, purified by chromatography, and the product thus obtained is 1-[2-(5-methyl-pyrazolyl-3)-ethyl]-4-phenyl-3,4-dehydro-piperidine, m.p. 68°.

Analogously, the corresponding 4-aryl-3,4-dehydro-piperidine derivatives are obtained with phenyl-, o-, m-, or p-tolyl-, o-, m-, or p-methoxyphenyl-, o-, m-, or p-chlorophenyl-, o-, m-, or p-fluorophenylmagnesium bromide, or with the analogous aryllithium compounds, from the following substances:

1-[2-(pyrazolyl-3)-ethyl]-piperidone-(4)
1-[2-(5-methyl-pyrazolyl-3)-ethyl]-piperidone-(4)
1-]1-(5-methyl-pyrazolyl-3)-propyl-(2)]-piperidone-(4)
1-[2-(pyrazolyl-4)-ethyl]-piperidone-(4)
1-[2-(1-methyl-pyrazolyl-4)-ethyl]-piperidone-(4)
1-[3-(1-methyl-pyrazolyl-4)-propyl]-piperidone-(4)
1-[1-(1,3-dimethyl-pyrazolyl-5)-ethyl[-piperidone-(4)
1-[1-(1,3-dimethyl-pyrazolyl-5)-propyl-(2)]-piperidone-(4)
1-[4-(1,3-dimethyl-pyrazolyl-5)-butyl]-piperidone-(4)
1-[2-(4-methyl-thiazolyl-5)-ethyl]-piperidone-(4)
1-[1-(2,4-dimethyl-thiazolyl-5)-propyl-(2)]-piperidone-(4)
1-[4-(2,4-dimethyl-thiazolyl-5)-butyl]-piperidone-(4)
1-[1-(3,4-methylenedioxyphenyl)-propyl-(2)]-piperidone-(4)
1-[1-(3,4-methylenedioxyphenyl)-butyl]-piperidone-(4).

EXAMPLE 18

17.4 g. of 1-[2-(5-methyl-pyrazolyl-3)-ethyl]-3-bromo-4-phenyl-piperidine or 15.2 g. of 1-[2-(5- methyl-pyrazolyl-3)-ethyl]-3chloro-4-phenyl-piperidine (obtainable from the corresponding 3-hydroxy compound with phosphorus tribromide or thionyl chloride) is heated with 20 g. of quinoline for 15 minutes to 180°. After cooling, the reaction mixture is worked up with water and ether, chromatographed, and the compound thus obtained is 1-[2-(5-methyl-pyrazolyl-3)-ethyl]-4-phenyl-3,4-dehydro-piperidine, m.p. 68°.

Analogously, the corresponding 4-aryl-3,4-dehydro-piperidine derivatives are obtained by the dehydrohalogenation of the following compounds:

1-[2-(pyrazolyl-3)-ethyl]-3-bromo-4-phenyl-piperidine
1-[1-(5-methyl-pyrazolyl-3)-propyl-(2)]-3-bromo-4-phenyl-piperidine
1-[2-(pyrazolyl-4)-ethyl]-3-bromo-4-phenyl-piperidine
1-[2-(1-methyl-pyrazolyl-4)-ethyl]-3-bromo-4-phenyl-piperidine
1-[3-(1-methyl-pyrazolyl-4)-propyl]-3-bromo-4-phenyl-piperidine
1-[1-(1,3-dimethyl-pyrazolyl-5)-ethyl]-3-bromo-4-phenyl-piperidine
1-[1-(1,3-dimethyl-pyrazolyl-5)-propyl-(2)]-3-bromo-4-phenyl-piperidine
1-[4-(1,3-dimethyl-pyrazolyl-5)-butyl]-3-bromo-4-phenyl-piperidine
1-[2-(4-methyl-thiazolyl-5)-ethyl]-3-bromo-4-phenyl-piperidine
1-[1-(2,4-dimethyl-thiazolyl-5)-propyl-(2)]-3-bromo-4-phenyl-piperidine
1-[4-(2,4-dimethyl-thiazolyl-5)-butyl]-3-bromo-4-phenyl-piperidine
1-[1-(3,4-methylenedioxyphenyl)-propyl-(2)]-3-bromo-4-phenyl-piperidine
1-[1-(3,4-methylenedioxyphenyl)-butyl]-3-bromo-4-phenyl-piperidine
1-[2-(5-methyl-pyrazolyl-3)-ethyl]-3-bromo-4-m-tolyl-piperidine or of the corresponding 3-chloro compounds.

EXAMPLE 19

A mixture of 10 g. of concentrated hydrochloric acid and 10 g. of 3-[2-(5-methyl-pyrazolyl-3)-ethyl]-6-methyl-6-phenyl-tetrahydro-1,3-oxazine (obtainable by heating 2-(5-methyl-pyrazolyl-3)-ethylamine hydrochloride, α-methylstyrene, and 37 percent aqueous formaldehyde to 60°, or by reacting 3-(2-chloroethyl)-5-methyl-pyrazole with 6-methyl-6-phenyl-tetrahydro-1,3-oxazine) is agitated at 100° for four hours, cooled, diluted with H$_2$O, and made alkaline with NaOH. The mixture is extracted with ether, dried over sodium sulfate, concentrated by evaporation, and the product thus obtained is 1-[2-(5-methyl-pyrazolyl-3)-ethyl]-4-phenyl-3,4-dehydro-piperidine, m.p. 68°. Maleate, m.p. 134°-136°.

Analogously, with hydrochloric acid, the corresponding 4-phenyl-3,4-dehydro-piperidine derivatives are produced from:

3-[2-(pyrazolyl-3)-ethyl]-
3-[1-(5-methyl-pyrazolyl-3)-propyl-(2)]-
3-[2-(pyrazolyl-4)-ethyl]-
3-[2-(1-methyl-pyrazolyl-4)-ethyl]-
3-[3-(1-methyl-pyrazolyl-4)-propyl]-
3-[1-(1,3-dimethyl-pyrazolyl-5)-ethyl[-
3-[1-(1,3-dimethyl-pyrazolyl-5)-propyl-(2)]-
3-[1-(1,3-dimethyl-pyrazolyl-5)-butyl[-
3-[2-(4-methyl-thiazolyl-5)-ethyl]-
3-[1-(2,4-dimethyl-thiazolyl-5)-propyl-(2)]-
3-[4-(2,4-dimethyl-thiazolyl-5)-butyl]-
3-[1-(3,4-methylenedioxyphenyl)-propyl-(2)]- or
3-[1-(3,4-methylenedioxyphenyl)-butyl]-6-methyl-6-phenyl-tetra-hydro-1,3-oxazine.

EXAMPLE 20

14 g. of dry (5-methyl-pyrazolyl-3)-acetic acid-(4-phenyl-3,4-dehydro-piperidide) (obtainable by reacting 5-methyl-pyrazolyl-3-acetyl chloride with 4 phenyl-3,4-dehydro-piperidine in absolute ether in the presence of triethylamine) is dissolved in 200 ml. of absolute tetrahydrofuran. The solution is added dropwise to a suspension of 5 g. of lithium aluminum hydride in 250 ml. of absolute ether under agitation and purging with dry nitrogen. The reaction mixture is refluxed for 20 hours and worked up as usual. After purification by chromatography, 1-[2-(5-methyl-pyrazolyl-3)-ethyl]-4-phenyl-3,4-dehydro-piperidine is obtained, m.p. 68°.

As the reducing agent, it is also possible to employ sodium bis(2-methoxyethoxy) aluminum dihydride, in an analogous manner.

By the reduction of:
(pyrazolyl-3)-acetic acid-(4-phenyl-piperidide)
(5-methyl-pyrazolyl-3)-acetic acid-(4-phenyl-piperidide)
(pyrazolyl-4)-acetic acid-(4-phenyl-piperidide)
(1-methyl-pyrazolyl-4)-acetic acid-(4-phenyl-piperidide)
3-(1-methyl-pyrazolyl-4)-propionic acid-(4-phenyl-piperidide)
(1,3-dimethyl-pyrazolyl-5)-acetic acid-(4-phenyl-piperidide)
4-(1,3-dimethyl-pyrazolyl-5)-butyric acid-(4-phenyl-piperidide)
(4-methyl-thiazolyl-5)-acetic acid-(4-phenyl-piperidide)
4-(2,4-dimethyl-thiazolyl-5)-butyric acid-(4-phenyl-piperidide)
4-(3,4-methylenedioxyphenyl)-butyric acid-(4-phenyl-piperidide)

or of the corresponding 4-o-, 4-m-, and 4-p-methoxyphenyl-piperidides, 4-o-, 4-m-, and 4-p-tolyl-piperidides, 4-o-, 4-m-, and 4-p-fluorophenyl-piperidides, 4-o-, 4-m-, and 4-p-chlorophenyl-piperidides, as well as of the corresponding 4-aryl-3,4-dehydro-piperidides, the corresponding piperidine or 3,4-dehydro-piperidine derivatives are respectively obtained.

EXAMPLE 21

A Grignard solution is prepared from 2.4 g. of magnesium and 20.7 g. of 1-(3-chloropropyl)-4-phenyl-3,4-dehydro-piperidine in 200 ml. of absolute tetrahydrofuran; this solution is then mixed, under agitation and cooling, dropwise with a solution of 11 g. of 3-formyl-5-methyl-pyrazole in 100 ml. of absolute tetrahydrofuran. After stirring the mixture for one hour at room temperature, it is decomposed with ice and dilute hydrochloric acid, rendered alkaline with aqueous ammonia, and repeatedly extracted with a large quantity of ether. After drying (MgSO$_4$) and concentrating the combined extracts by evaporation, the crude residue, consisting of 1-(5-methyl-pyrazolyl-3)-4-(4-phenyl- 3,4-dehydro-piperidino)-1-butanol in addition to a small amount of 1-(5-methyl-pyrazolyl-3)-4-(4-phenyl-3,4-dehydro-piperidino)-butene, is dissolved in 400 ml. of ethanol and hydrogenated with the addition of 3 g. of 5 percent palladium charcoal at room temperature and under normal pressure, thus obtaining 1-[4-(5-methyl-pyrazolyl-3)-butyl]-4-phenyl-3,4-dehydro-piperidine.

In an analogous manner, 1-[4-(5-methyl-pyrazolyl-3)-butyl]-4-phenyl-piperidine is obtained with 1-(3-chloropropyl)-4-phenyl-piperidine, and from:
1,3-dimethyl-5-formyl-pyrazole,
2,4-dimethyl-5-formyl-thiazole, or
piperonal
the corresponding 4-(4-phenyl-piperidino)-butyl- and 4-(4-phenyl-3,4-dehydro-piperidino)-butyl-derivatives are produced.

EXAMPLE 22

5 g. of 1-(1-methyl-pyrazolyl-4)-2-(4-phenyl-piperidino)-ethanone [obtainable by reacting 4-phenyl-piperidine with 1-methyl-4-bromoacetyl-pyrazole] is hydrogenated in 250 ml. of methanol on 0.3 g. of $PdCl_2$ under an initial pressure of 2.5 atmospheres until the hydrogen absorption is terminated. The reaction product is filtered, concentrated by evaporation, and 1-[2-(1-methyl-pyrazolyl-4)-ethyl]-4-phenyl-piperidine is thus obtained; maleate, m.p. 125°–127°.

Analogously, the corresponding substituted alkanes are produced by hydrogenating the following compounds:
1-(pyrazolyl-3)-2-(4-phenyl-piperidino)-ethanone
1-(5-methyl-pyrazolyl-3)-2-(4-phenyl-piperidino)-ethanone
1-(5-methyl-pyrazolyl-3)-2-(4-phenyl-piperidino)-propan-1-one
1-(pyrazolyl-4)-2-(4-phenyl-piperidino)-ethanone
1-(1-methyl-pyrazolyl-4)-3-(4-phenyl-piperidino)-propan-1-one
1-(1,3-dimethyl-pyrazolyl-5)-2-(4-phenyl-piperidino)-ethanone
1-(1,3-dimethyl-pyrazolyl-5)-2-(4-phenyl-piperidino)-propan-1-one
1-(1,3-dimethyl-pyrazolyl-5)-4-(4-phenyl-piperidino)-butan-1-one
1-(4-methyl-thiazolyl-5)-2-(4-phenyl-piperidino)-ethanone
1-(2,4-dimethyl-thiazolyl-5)-2-(4-phenyl-piperidino)-propan-1-one
1-(2,4-dimethyl-thiazolyl-5)-4-(4-phenyl-piperidino)-butan-1-one
1-(3,4-methylenedioxyphenyl)-2-(4-phenyl-piperidino)-propan-1-one
1-(3,4-methylenedioxyphenyl)-4-(4-phenyl-piperidino)-butan-1-one.

EXAMPLE 23

13 g. of 1-(2,4-dimethyl-thiazolyl-5)-4-(4-phenyl-piperidino)-butan-2-one (obtainable by reacting (2,4-dimethyl-thiazolyl-5)-acetone with formaldehyde and 4-phenyl-piperidine, or by cyanoethylating 4-phenyl-piperidine, reacting the thus-produced 1-cyano-2-(4-phenyl-piperidino)-ethane with 2,4-dimethyl-thiazolyl-5-magnesium chloride and hydrolysis) is heated in 100 ml. of diethylene glycol, together with 6 g. of KOH and 10 ml. of 85 percent hydrazine, for 1 hour to 100°. Thereafter, the temperature is gradually increased until the hydrazone is decomposed, during which step the excess of hydrazine and the thus-formed water evaporate. The mixture is boiled for another 4 hours, allowed to cool, water and benzene are added thereto, the mixture is separated, and dried over $MgSO_4$. After concentraction by evaporation, 1-[4-(2,4-dimethyl-thiazolyl-5)-butyl]-4-phenyl-piperidine is obtained; dihydrochloride, m.p. 186°–188°.

Analogously, the corresponding compounds of Formula I are produced by Wolff-Kishner reduction of the ketones set forth in Example 22, or of:
1-(1-methyl-pyrazolyl-4)-3-(4-phenyl-piperidino)-propan-2-one
1-(1,3-dimethyl-pyrazolyl-5)-4-(4-phenyl-piperidino)-butan-2-one
1-(1,3-dimethyl-pyrazolyl-5)-4-(4-phenyl-piperidino)-butan-3-one
1-(2,4-dimethyl-thiazolyl-5)-4-(4-phenyl-piperidino)-butan-3-one
1-(3,4-methylenedioxyphenyl)-4-(4-phenyl-piperidino)-butan-2-one
1-(3,4-methylenedioxyphenyl)-4-(4-phenyl-piperidino)-butan-3-one
or of the corresponding ketones unsaturated in the 3(4)-position of the piperidine ring, e.g.:
1-(5-methyl-pyrazolyl-3)-2-(4-phenyl-3,4-dehydro-piperidino)-ethanone
1-(5-methyl-pyrazolyl-3)-2-(4-m-tolyl-3,4-dehydro-piperidino)-ethanone.

EXAMPLE 24

One gram of sodium is added in small pieces to a fine suspension of 7 g. of 1-[2-(1-benzyl-5-methyl-pyrazolyl-3)-ethyl]-3,4-dehydro-4-phenyl-piperidine (obtainable from 1-benzyl-3-(2-chloroethyl)-5-methyl-pyrazole) in 65 ml. of liquid ammonia. To this mixture is added 3 g. of ammonium chloride, the ammonia is allowed to evaporate, the residue is mixed with water and extracted with chloroform. After evaporating the chloroform, 1-[2-(5-methyl-pyrazolyl-3)-ethyl]-3,4-dehydro-4-phenyl-piperidine is obtained, m.p. 68°.

In an analogous manner, the corresponding compounds of Formula I are produced by reductively splitting the following substances:
1-[2-(1-benzyl-pyrazolyl-3)-ethyl]-4-phenyl-piperidine
1-[2-(1-benzyl-pyrazolyl-3)-ethyl]-4-phenyl-3,4-dehydro-piperidine
1-[2-(1-benzyl-5-methyl-pyrazolyl-3)-ethyl]-4-phenyl-piperidine
1-[2-(1-benzyl-5-methyl-pyrazolyl-3)-ethyl]-4m-tolyl-3,4-dehydro-piperidine
1-[1-(1-benzyl-5-methyl-pyrazolyl-3)-propyl-(2)]-4-phenyl-piperidine
1-[1-(1-benzyl-5-methyl-pyrazolyl-3)-propyl-(2)-4-phenyl-3,4-dehydro-piperidine
1-[2-(1-benzyl-pyrazolyl-4)-ethyl]-4-phenyl-piperidine
1-[2-(1-benzyl-pyrazolyl-4)-ethyl]-4-phenyl-3,4-dehydro-piperidine.

EXAMPLE 25

Under agitation, 1 g. of $NaBH_4$ in 20 ml. of water is added to a solution of 7 g. of 1-[2-(5-methyl-pyrazolyl-3)-ethyl]-4-phenyl-pyridinium bromide (obtainable from 3-(2-bromoethyl)-5-methyl-pyrazole and 4- phenyl-pyridine) in 50 ml. of 1N NaOH; then, the reaction mixture is agitated for another 3 hours at 60°. After the usual working-up steps, 1-[2-(5-methyl-pyrazolyl-3)-ethyl]-4-phenyl-3,4-dehydro-piperidine is produced, m.p. 68°.

Analogously, the corresponding 3,4-dehydro-piperidines are obtained with NaBH₄ from:

1-[2-(pyrazolyl-3)-ethyl]-4-phenyl-pyridinium bromide
1-[2-(5-methyl-pyrazolyl-3)-ethyl]-4-m-tolyl-pyridinium bromide
1-[1-(5-methyl-pyrazolyl-3)-propyl-(2)]-4-phenyl-pyridinium bromide
1-[2-(pyrazolyl-4)-ethyl]-4-phenyl-pyridinium bromide
1-[2-(1-methyl-pyrazolyl-4)-ethyl]-4-phenyl-pyridinium bromide
1-[3-(1-methyl-pyrazolyl-4)-propyl]-4-phenyl-pyridinium bromide
1-[2-(1,3-dimethyl-pyrazolyl-5)-ethyl]-4-phenyl-pyridinium bromide
1-[1-(1,3-dimethyl-pyrazolyl-5)-propyl-(2)]-4-phenyl-pyridinium bromide
1-[4-(1,3-dimethyl-pyrazolyl-5)-butyl]-4-phenyl-pyridinium bromide
1-[2-(4-methyl-thiazolyl-5)-ethyl]-4-phenyl-pyridinium bromide
1-[1-(2,4-dimethyl-thiazolyl-5)-propyl-(2)]-4-phenyl-pyridinium bromide
1-[4-(2,4-dimethyl-thiazolyl-5)-butyl]-4-phenyl-pyridinium bromide
1-[1-(3,4-methylenedioxyphenyl)-propyl-(2)]-4-phenyl-pyridinium bromide
1-[4-(3,4-methylenedioxyphenyl)-butyl]-4-phenyl-pyridinium bromide, as well as from the corresponding 4-o-, 4-m-, and 4-p-methoxy-phenyl-, as well as 4-o-, 4-m-, and 4-p-chlorophenyl-derivatives or from the corresponding chlorides or iodides.

EXAMPLE 26

One gram of 1-[2-(5-methyl-pyrazolyl-3)-ethyl]-4-phenyl-pyridinium chloride is dissolved in 25 ml. of methanol, hydrogenated on 0.1 g. of platinum at 25° and under normal pressure until the reaction is terminated; the product is filtered, concentrated by evaporation, and the product obtained after the usual workingup procedure is 1-[2-(5-methyl-pyrazolyl-3)-ethyl]-4-phenyl-piperidine, m.p. 103°–104°.

EXAMPLE 27

5.1 g. of 1-[2-(5-methyl-pyrazolyl-3)-ethyl]-4-bromo-4-phenyl-piperidine dihydrobromide (obtainable by HBr addition to the corresponding 3,4-dehydro compound) is heated in 200 ml. of water for 2 hours on a steam bath. After cooling, the reaction mixture is made alkaline with excess 50 percent sodium hydroxide solution and extracted with chloroform. The chloroform phase, dried over potassium carbonate yields, after being concentrated by evaporation, 1-[2-(5-methyl-pyrazolyl-3)-ethyl]-4-hydroxy-4-phenyl-piperidine.

EXAMPLE 28

(a) 2.8 g. of 1-[2-(5-methyl-pyrazolyl-3)-ethyl]-3,4-dehydro-4-(m-aminophenyl)-piperidine (obtainable by reduction of the corresponding nitro compound) is dissolved in a mixture of 12 ml. of water and 5 ml. of concentrated hydrochloric acid and then mixed dropwise, at 3°–6°, with a solution of 0.7 g. of NaNO₂ in 2 ml. of water. The thus-obtained diazonium salt solution is added to a weakly boiling solution of Cu₂Cl₂ (prepared from 2 g. of copper sulfate and 2 g. of NaCl in 8 ml. of water with SO₂). Thereafter, the temperature is maintained for 30 minutes at 90°–95°, the mixture is cooled, made alkaline with NaOH, extracted with ether, dried over sodium sulfate, and evaporated, thus obtaining 1-2-(5-methyl-pyrazolyl-3)-ethyl]-3,4-dehydro-4-(m-chlorophenyl)-piperidine.

(b) 3 g. of crude 1-[2-(5-methyl-pyrazolyl-3)-ethyl]-3,4-dehydro-4-(m-chlorophenyl)-piperidine is hydrogenated, with the addition of 0.5 g. of 5 percent Pd-C catalyst, in 40 ml. of methanol under normal pressure and at a temperature of 55° until the reaction is terminated. The mixture is allowed to cool, filtered off from the catalyst, and concentrated by evaporation, thus producing 1-[2-(5-methyl-pyrazolyl-3)-ethyl]-4-phenyl-piperidine, m.p. 103°–104°.

EXAMPLE 29

(a) 6 g. of 1-[2-(5-methyl-pyrazolyl-3)-ethyl]-3-amino-4-phenyl-piperidine (obtainable from the corresponding oxime by hydrogenation) is dissolved in 1.7 ml. of concentrated hydrochloric acid and 100 ml. of water and mixed dropwise with a saturated aqueous solution of 4 g. of sodium nitrite. Then, the mixture is heated on a steam bath until the evolution of nitrogen has stopped; the aqueous solution is rendered alkaline with solution of sodium hydroxide, and extracted with methylene chloride. The methylene chloride phase, concentrated by evaporation, yields, after chromatography, 1-[2(5-methyl-pyrazolyl-3)-ethyl]-3-hydroxy-4-phenyl-piperidine.

(b) 5 g. of 1-[2-(5-methyl-pyrazolyl-3)-ethyl]-3-hydroxy-4-phenyl-piperidine is triturated with 50 g. of KHSO₄ and heated for 4 hours to 180°. After cooling, the mixture is made alkaline with dilute sodium hydroxide solution, extracted with chloroform, and the residue obtained by evaporation is chromatographed, thus obtaining 1-[2-(5-methyl-pyrazolyl-3)-ethyl]-4-phenyl-3,4-dehydro-piperidine, m.p. 68°.

(c) One gram of 1-[2-(5-methyl-pyrazolyl-3)-ethyl]-4-phenyl-3,4-dehydro-piperidine is dissolved in 25 ml. of methanol and hydrogenated on 0.1 g. of 5 percent Pd on Al₂O₃ at 25° and under normal pressure until the reaction is terminated. After filtering off the reaction mixture and concentration by evaporation, 1-[2-(5-methyl-pyrazolyl-3)-ethyl]-4-phenyl-piperidine is produced, m.p. 103°–104°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pyrazolyl-piperidine of the formula

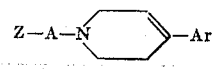

wherein Z is pyrazolyl-3, pyrazolyl-4 or pyrazolyl-5, unsubstituted or substituted by at least one of alkyl of one to four carbon atoms and N-acyl wherein acyl is the acyl group of a hydrocarbon carboxyclic acid of up to 10 carbon atoms or is alkoxycarbonyl or alkylcarbonyl of up to 10 carbon atoms, A is alkylene of 1 to 6 carbon atoms, and Ar is phenyl or phenyl substituted by at least one halogen atom, alkyl of one to four carbon atoms or alkoxy of one to four carbon atoms, and the physiologically acceptable acid addition and quaternary ammonium salts thereof.

2. A compound according to claim 1 wherein alkyl is methyl and acyl is hydrocarbon carboxylic acid acyl.

3. A compound according to claim 1 wherein A is $-CH_2CH_2-$, $-CH_2CH(CH_3)-$, $-CH_2CH_2CH_2-$, $-CH_2CH_2CH_2CH_2-$.

4. A compound according to claim 1 wherein Ar is phenyl or phenyl substituted by a chlorine atom, methyl or methoxy.

5. A compound according to claim 4 wherein Ar is phenyl.

6. A compound according to claim 1 wherein A is $-CH_2CH_2-$, $-CH_2CH(CH_3)-$, $-CH_2CH_2CH_2-$, or $-CH_2CH_2CH_2CH_2-$; and Ar is phenyl or phenyl substituted by a chlorine atom, methyl or methoxy.

7. A compound according to claim 6 wherein Ar is phenyl.

8. A compound according to claim 6 wherein Z is pyrazolyl-3, 5-methyl-pyrazolyl-3, pyrazolyl-4, 1-methyl-pyrazolyl-4 or 1,3-dimethyl-pyrazolyl-5, and Ar is phenyl.

9. A compound of claim 1, 1-[2-(pyrazolyl-3)-ethyl]-4-phenyl-3,4-dehydro-piperidine.

10. A compound of claim 1, 1-[2-(5-methyl-pyrazolyl-3)-ethyl]-4-phenyl-3,4-dehydro-piperidine.

11. A compound of claim 1, 1-[1-(5-methyl-pyrazolyl-3)-propyl-(2)]-4-phenyl-3,4-dehydro-piperidine.

12. A compound of claim 1, 1-[2-(pyrazolyl-4)-ethyl]-4-phenyl-3,4-dehydro-piperidine.

13. A compound of claim 1, 1-[2-(1-methyl-pyrazolyl-4)-ethyl]-4-phenyl-3,4-dehydro-piperidine.

14. A compound of claim 1, 1-[4-(1,3-dimethyl-pyrazolyl-5)-butyl]-4-phenyl-3,4-dehydro-piperidine.

15. A compound of claim 1, 1-[2-(1-acetyl-3-methyl-pyrazolyl-5)-ethyl]-4-phenyl-3,4-dehydro-piperidine.

16. A compound of claim 1, 1-[2-(1-acetyl-5-methyl-pyrazolyl-3)-ethyl]-4-phenyl-3,4-dehydro-piperidine.

17. A compound of claim 1, 1-[2-(5-methyl-pyrazolyl-3)-ethyl]-4-m-tolyl-3,4-dehydro-piperidine.

* * * * *